(12) United States Patent
Aryal et al.

(10) Patent No.: US 12,644,051 B2
(45) Date of Patent: *Jun. 2, 2026

(54) METHODS FOR CONTROLLING THE PHASE OF SELF-ASSEMBLED IONIC LIQUID CRYSTAL (ILC) STRUCTURES

(71) Applicant: Tokyo Electron Limited, Tokyo (JP)

(72) Inventors: Dipak Aryal, Austin, TX (US); Kate Abel, Austin, TX (US); Antonio Luis Pacheco Rotondaro, Austin, TX (US); Takeo Nakano, Nirasaki City (JP); Tamotsu Morimoto, Nirasaki City (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/677,975

(22) Filed: May 30, 2024

(65) Prior Publication Data

US 2025/0368898 A1     Dec. 4, 2025

(51) Int. Cl.

| | |
|---|---|
| *G02F 1/1333* | (2006.01) |
| *B82Y 20/00* | (2011.01) |
| *B82Y 30/00* | (2011.01) |
| *C09K 19/40* | (2006.01) |
| *G02F 1/136* | (2006.01) |
| *C09K 19/04* | (2006.01) |

(52) U.S. Cl.
CPC ............ *C09K 19/404* (2013.01); *B82Y 20/00* (2013.01); *B82Y 30/00* (2013.01); *G02F 1/13613* (2021.01); *C09K 2019/0414* (2013.01)

(58) Field of Classification Search
CPC ................... C09K 19/40; C09K 19/54; C09K 2019/0403; C09K 2019/0414; G02F 1/1333; G02F 1/13613
See application file for complete search history.

(56) References Cited

U.S. PATENT DOCUMENTS

| | | | |
|---|---|---|---|
| 8,048,795 B2 | 11/2011 | Lee et al. | |
| 8,669,645 B2 | 3/2014 | Millward et al. | |
| 8,900,963 B2 | 12/2014 | Sills et al. | |
| 12,398,324 B1 * | 8/2025 | Aryal ...................... | C07F 5/069 |
| 2004/0235199 A1 | 11/2004 | Jung et al. | |
| 2019/0211130 A1 | 7/2019 | Morita et al. | |
| 2019/0278172 A1 | 9/2019 | Lee et al. | |
| 2023/0230855 A1 | 7/2023 | Nakano et al. | |
| 2025/0157810 A1 * | 5/2025 | Abel ................. | H01L 21/02172 |
| 2025/0157820 A1 * | 5/2025 | Aryal ................. | H01L 21/0332 |

OTHER PUBLICATIONS

Tanaka et al., "Self-Assembling Imidazolium-Based Ionic Liquid in Rigid Nanopores Induces Anomalous CO2 Adsorption at Low Pressure", Langmuir, 2011, 27, 13, 7991-7995 (Year: 2011).*

Nickmans et al., "Directed Self-Assembly Of Liquid-Crystalline Molecular Building Blocks For Sub-5 nm Nanopatterning", Advanced Materials, Progress Report, Adv. Mater. 2018, 16 pgs.
Hayashi et al., "Discovery Of A Magnetic Ionic Liquid [bmim]FeCi4", Chemistry Letters vol. 33, No. 12, 2004, 2 pgs.
Fernandez et al., "Key Developments In Ionic Liquid Crystals", International Journal Of Molecular Sciences, 2016, 31 pgs.
Pinto-Gomez et al., "Directed Self-Assembly Of Block Copolymers For The Fabrication Of Functional Devices", MDPI, 2020, 21 pgs.
Zhong et al., "Syntheses, Structures, And Properties of A Series Of Metal Ion-Containing Dialkylimidazolium Ionic Liquids", The Chemical Society of Japan, 2007, 11 pgs.
Konwar et al., "Transition Metal Containing Ionic Liquid-Assisted One-Pot Synthesis Of Pyrazoles At Room Temperature", J. Chem. Sci., 2019, 9 pgs.
Ding et al., "Transition Metal-Containing Ionic Liquid Crystals With 1-Decyl-2, 3-Dimethylimidazolium; Facile Syntheses, Crystal Structures, Thermal Properties And NH3 Detection", Wiley-VCH, Chemistry—Europe On Line Library, 2018, 7 pgs.
Kapernaum et al., "Current Topics In Ionic Liquid Crystals", Chemistry Europe, ChemPlusChem, 2022, 38 pgs.
Saielli, "Comparison Of The Ionic Liquid Crystal Phase Of [C12C1im] [BF4] and [C12c1im]C1 By Atomistic MD Simulations", Crystals, MDPI, Mar. 2020, 10 pgs.
Renier et al., "Developing Design Tools For Introducing And Tuning Structural Order In Ionic Liquids", Royal Society Of Chemistry, CrystEngComm, 2021, 11 pgs.
Pulukkody et al., "Mesomorphism Of Imidazolium-Based Fluorinated Ionic Liquids", Journal Of Ionic Liquids, 2024, 8 pgs.
Wang et al., "Regulating The Mesogenic Properties Of Imidazolium Salts By Modifying N3-Substituents", Science China Chemistry, vol. 58, No. 12, 2015, 7 pgs.
Kloos et al., "Self-Assembling Liquid Crystals As Building Blocks To Design Nanoporous Membranes Suitable For Molecular Separations", Journal Of Membrane Science, 2021, 18 pgs.
"Notification Of Transmittal Of The International Search Report And The Written Opinion Of The International Searching Authority, Or The Declaration", International Application No. PCT/US2025/019594, International Filing Date Mar. 12, 2025, Date of Mailing Jun. 25, 2025, 9 pgs.
Li et al., "Self-Assembly Of Ionic Superdiscs In Nanopores", ACS Nano, 18, 2024, 13 pgs.

* cited by examiner

Primary Examiner — Geraldina Visconti
(74) Attorney, Agent, or Firm — Egan, Enders & Huston LLP.

(57) ABSTRACT

Embodiments of improved methods are provided to form ordered structures on a surface of a substrate using direct self-assembly (DSA) of ionic liquid crystals (ILCs). More specifically, various embodiments of methods are provided to control the phase of an ordered structure formed on a substrate surface via self-assembly of ILCs having cation head groups, alkyl tail groups having a plurality of hydrocarbons and anions. In the embodiments disclosed herein, the phase of the ordered structure is controlled by replacing the hydrogen (H) atoms of the hydrocarbons included the alkyl chain with larger sized functional groups. Adding larger sized functional groups to the alkyl chain changes the phase of the ordered structure by: (a) increasing the separation between the hydrophilic (cation) and hydrophobic (alkyl tail) groups of the ILCs, and (b) changing the orientation of alkyl tails within the tail groups of the self-assembled ILCs.

24 Claims, 8 Drawing Sheets
(6 of 8 Drawing Sheet(s) Filed in Color)

100

Cation
Head Group

Alkyl
Tail Group

Organic
Anion

110

$[C_{12}mim][BF_4^-]$ $[C_{12}mim][BF_4^-]$

[C$_{12}$mim][CH$_3$][BF$_4^-$]     400

402            404

406

450

[C$_{12}$mim][CH$_3$][BF$_4^-$]

454

452

METHODS FOR CONTROLLING THE PHASE OF SELF-ASSEMBLED IONIC LIQUID CRYSTAL (ILC) STRUCTURES

RELATED APPLICATION DATA

This application is related to co-pending U.S. patent application Ser. No. 18/388,222, filed Nov. 9, 2023, entitled "Methods for Patterning a Semiconductor Substrate Using Metalate Salt Ionic Liquid Crystals," co-pending U.S. patent application Ser. No. 18/388,240, filed Nov. 9, 2023, entitled "Methods for Forming Vertically Layered Ionic Liquid Crystal (ILC) Structures on a Semiconductor Substrate," and co-pending U.S. patent application Ser. No. 18/677,972, filed May 30, 2024, entitled "Methods for Controlling the Pitch of Self-Assembled Ionic Liquid Crystal (ILC) Structures;" the disclosures of which are expressly incorporated herein, in their entirety, by reference.

TECHNICAL FIELD

The present disclosure relates to the processing of semiconductor substrates. In particular, it provides improved methods for controlling the phase of ionic liquid crystal (ILC) structures, which self-assemble on semiconductor substrates.

BACKGROUND

Semiconductor devices, such as integrated circuits (ICs), are fabricated by sequentially depositing and patterning layers of dielectric, conductive, and semiconductor materials over a semiconductor substrate to form a network of electronic components and interconnect elements (e.g., transistors, resistors, capacitors, metal lines, contacts, and vias), which are integrated in a monolithic structure. At each successive technology node, the minimum feature sizes are shrunk to reduce cost by roughly doubling the component packing density.

A common patterning method uses a photolithography process, which includes photoresist coating, exposure and development steps, to form a desired pattern on a substrate surface that can be transferred to an underlying layer. In conventional photolithography processes, a substrate surface is coated with a light-sensitive photoresist film and exposed to light to convert exposed portions of the light-sensitive photoresist film to a reacted photoresist. After exposure, a developing step is performed to remove the reacted (or unreacted) portion of the photoresist film for patterning, thus providing a photoresist pattern on the substrate.

In this technique, the resolution of the optical system used to perform the lithography step limits the minimum feature size that can be patterned with acceptable control and the minimum pitch between the features in the pattern. According to the Rayleigh criterion, the minimum feature size is proportional to the wavelength (A) of light used for imaging, and inversely proportional to the numerical aperture (NA) of the projection lens. Over time, shorter wavelengths of light—from visible wavelengths (436 nm) to UV (365 nm), deep-UV (248 and 193 nm) and extreme-UV (EUV, 13.5 nm) wavelengths—have been utilized to reduce the feature size and pitch obtainable for advanced technology nodes. Today, EUV lithography is commonly used at the industry level for advanced patterning at 10 nm, 7 nm and 5 nm technology nodes.

As feature sizes continue to scale below 5 nm, it becomes desirable to produce patterns with critical dimensions (CDs) smaller than the wavelengths of light widely available for industrial applications. This requires new pattern-transfer methods, since the resolution of the optical system remains limited by the wavelength (A) of light used for imaging. One method for achieving suitable photolithography for increasingly smaller CDs is to use a multi-patterning technique for pitch splitting or pitch multiplication. Examples of multi-patterning techniques include self-aligned double patterning (SADP), self-aligned triple patterning (SATP) and self-aligned quadruple patterning (SAQP). These multi-patterning techniques involve the utilization of sidewall spacers, fill layers and selective etching for defining structures at pitches, which are less than the original photolithography pitch.

Direct self-assembly (DSA) of polymers and other small molecules has recently been investigated as another pitch multiplier for pattern transfer technology. In these methods, large templates are patterned to direct the molecular self-assembly of polymers or other small molecules, which self-assemble within the larger template to produce substantially smaller pitch patterns. The self-assembled patterns are then used as the template for pattern transfer.

DSA of block copolymers (BCPs) has been widely investigated as a pitch multiplier for pattern-transfer technology, due to its high resolution, low cost and ease of integration and scalability. BCPs are macromolecules consisting of covalently bonded homogeneous blocks (or chains) of chemically different monomers. Due to the dis-affinity and repulsion forces between these blocks, BCPs phase segregate into microdomains to generate self-assembled patterns within the nano/microscale domain. After self-assembly, one of the blocks is removed and the remaining polymer is used as mask to pattern the underlying substrate.

Although DSA of block copolymers has received much attention, there are several issues preventing their integration into the semiconductor patterning process. First, since the characteristic dimensions of BCPs are controlled by the molecular weight of the polymer, the minimum pitch that can be achieved through BCP self-assembly is currently limited to 10 nm. Thus, DSA of block copolymers cannot be used as a pitch multiplier for pattern transfer at sub-10 nm feature sizes. Second, BCPs are soft organic building blocks that have a tendency to form arbitrarily oriented poly-domain structures when left unguided. This prevents their use in pattern transfer technology.

Ionic liquid crystals have recently been proposed as another class of materials for molecular self-assembly. Ionic liquid crystals (ILCs) are a distinct class of thermotropic liquid crystals (LCs) having the properties of both liquid crystals and ionic liquids (ILs). From a molecular standpoint, ILCs are salts with low melting temperatures (e.g., less than 100° C.) and typically consist of a large, organic cation head group (sometimes referred to as a mesogenic ion), which is covalently bound to an elongated alkyl tail group and a smaller, more spherical anion (sometimes referred to as a counter ion). Due to the difference in polarity between the ionic groups, ILCs spontaneously self-assemble or segregate into various ordered phases (otherwise referred to as mesophases) in the temperature range between the solid crystalline state and the isotropic liquid state.

ILCs can self-assemble into a wide variety of ordered phases, including nematic (N), smectic (Sm), columnar (Col) and cubic (Cub) phases. However, most ILCs have a strong tendency to form smectic phases, and most commonly form smectic-A (SmA) phases, although smectic-C (SmC) and smectic-T (SmT) phases can also be formed. ILCs that self-assemble into Sm phases form layered structures (or "lamellar structures") containing alternating two-dimensional (2D) layers of the ionic and non-ionic segments of the ILC building blocks. Specifically, during self-assembly of Sm phases, the cations and anions of the ILCs segregate into a first layer, while the alkyl tails segregate into a second layer, which is stacked on top of the first layer. In SmA phases, the self-assembled ILCs are oriented in a direction (n), which is parallel to the stacking direction (k) of the distinct layers.

ILCs including a wide variety of cations, anions and alkyl chain lengths are known. For example, ILCs having imidazolium, pyrazolium, pyrrolidinium, pyridinium, piperidinium, morpholinium, ammonium, phosphonium, sulphonium or cholinium-based cation head groups have been described in the literature. ILCs having imidazolium cation head groups have been extensively studied and are commonly used to form self-assembled ILC structures. FIG. 1A provides a mapping of coarse grain (CG) particles within an example ILC molecule 100 ([$C_{12}$mim][$BF_4^-$]: 1-dodecyl-3-methylimidazolium tetrafluoroborate) containing an imidazolium-based cation head group ([$C_{12}$mim]: 1-dodecyl-3-methylimidazolium) covalently bound to an alkyl tail group consisting of twelve hydrocarbons (e.g., 11 $CH_2$ groups and 1 terminal $CH_3$ group). The counter ion used within the ILC molecule 100 is a tetrafluoroborate ($BF_4^-$).

FIG. 1B illustrates the ordered structure formed by direct self-assembly of the ILC molecules 100 shown in FIG. 1A. As shown in FIG. 1B, [$C_{12}$mim][$BF_4^-$] ILCs self-assemble into a lamellar structure 110 of alternating 2D layers, with the cation head groups and anions of the ILCs segregated to a first distinct layer 120 (approximately 1 nm wide), and the interdigitated alkyl tail groups of the ILCs segregated to a second distinct layer 130 (approximately 2 nm wide) stacked on the first distinct layer 120. The pitch (p) between the alternating 2D layers of the lamellar structure 110 is equal to the combined width (approximately 3 nm) of the head and tail groups layers of the self-assembled ILCs. As shown in FIG. 1B, the self-assembled ILCs orient themselves in a direction (n), which is parallel to the stacking direction (k) of the alternating 2D layers, thus forming a lamellar structure 110 with an SmA mesophase.

Similar to block copolymers, ILCs self-assemble into ordered structures, albeit at a much smaller scale. The ordered structures produced by self-assembled ILCs can be used in pattern transfer methods. While the SmA mesophase shown in FIG. 1B can be useful for pattern transfer, it may be desirable to control or alter the phase of the self-assembled ILCs to produce different ordered structures.

SUMMARY

The present disclosure provides various embodiments of methods to form ordered structures on a surface of a substrate using direct self-assembly (DSA) of ionic liquid crystals (ILCs). More specifically, the present disclosure provides various embodiments of methods to control the phase of an ordered structure formed on a substrate surface via self-assembly of ILCs having cation head groups, anions and alkyl tail groups, each having a chain of hydrocarbons. The ILCs used to form the ordered structure may include a wide variety of cation head groups, anions and alkyl chain lengths sufficiently long to support a mesophase.

In the embodiments disclosed herein, the mesophase (or simply "phase") of an ordered structure is controlled by replacing the hydrogen (H) atoms within the chain of hydrocarbons with larger sized functional groups (such as, e.g., methyl groups, ethyl groups, n-propyl groups, iso-propyl groups, etc.). Adding larger sized functional groups to the alkyl chain changes the phase of the ordered structure by: (a) increasing the separation between the hydrophilic (cation) and hydrophobic (alkyl tail) groups of the ILCs, and (b) changing the orientation of alkyl tails within the tail groups of the self-assembled ILCs.

The techniques disclosed herein can be used to control the phase of an ordered structure formed on a substrate surface via self-assembly of various ILCs. In some embodiments, the phase of the ordered structure can be changed by replacing the hydrogen (H) atoms in the alkyl chain of the ILCs with methyl ($CH_3$) groups. Replacing the H atoms with larger $CH_3$ groups prevents the alkyl tails from interdigitating and changes the orientation of the alky tails within the tail groups of the self-assembled ILCs. In some embodiments, an ordered structure may be formed via self-assembly of imidazolium-based ILCs having an alkyl chain length of 8-18 hydrocarbons. By replacing the H atoms in the alkyl chain with $CH_3$ groups, the techniques described herein randomize the orientation of alkyl tails within the tail groups of the self-assembled ILCs to change the phase of the ordered structure, thereby changing the ordered structure from a layered structure to nanopore/rod structure.

According to one embodiment, a method is provided herein to control a phase of a self-assembled ionic liquid crystal (ILC) structure formed on a substrate. The method may generally include providing a solution comprising ionic liquid crystals (ILCs) having cation head groups, anions and alkyl tail groups, each alkyl tail group comprising a chain of hydrocarbons, and depositing the solution onto a surface of the substrate. Once deposited, the ILCs self-assemble on the surface of the substrate to form an ordered structure having alternating head groups and tail groups, wherein the cation head groups and the anions of the ILCs segregate to the head groups and the alkyl tail groups segregate to the tail groups. The method further includes controlling the phase of the ordered structure by replacing hydrogen (H) atoms within the chain of hydrocarbons with larger functional groups prior to depositing the solution onto the surface of the substrate.

The ILCs used in the method described above may include a wide variety of cation head groups. For example, the ILCs may include imidazolium, pyrazolium, pyrrolidinium, pyridinium, piperidinium, morpholinium, ammonium, phosphonium, sulphonium or cholinium-based cation head groups. In some embodiments, the ILCs may include an imidazolium-based cation head group of the form: 1-$R_1$-3-$R_2$-imidazolium, where $R_1$ is an alkyl chain with a chain length ranging from 8-18 hydrocarbons, and $R_2$ is a hydrogen, methyl, ethyl, propyl, butyl, substituted or unsubstituted phenyl, or other hydrocarbon group. In one example embodiment, the cation head groups may comprise 1-dodecyl-3-methylimidazolium.

The ILCs used in the method described above may also include a wide variety of anions. For example, the anions may comprise tetrafluoroborate ($BF_4^-$), chloride ($Cl^-$), acetate ($CH_3COO^-$), hexafluorophosphate ($PF_6^-$), trifluoromethyl acetate ($C_3H_3F_3O_2^-$), nitrate ($NO_3^-$), dicyanamide ($C_2HN_3^-$), tetracyanoborate ($B(CN)_4^-$), trifluoromethane sulfonate ($CF_3O_3S^-$), bis((trifluoromethyl)sulfonyl)imdide ([($CF_3SO_2)_2N]^-$), tetrachloroaluminate ([$AlCl_4]^-$), heptachlorodialuminate ([$Al_2Cl_7]^-$), decachlorotrialuminate ([$Al_3Cl_{10}]^-$), tridecachlorotetraaluminate ([$Al_4Cl_{13}]^-$), tetrachloroferrate ($Cl_4Fe^-$), trichlorostannate ([$SnCl_3]^-$), pentachlorodistannate ([$Sn_2Cl_5]^-$), tetrachloroindate ([InCl$_4$]—), nonachlorodititanate ([Ti$_2$Cl$_9$]—), nonachlorodizirconate ([Zr$_2$Cl$_9$]—), nonachlorodihafnate ([Hf$_2$Cl$_9$]—), tetrachloroaurate ([AuCl$_4$]—), tetrachlorogallate ([GaCl$_4$]—), heptachlorodigallate ([Ga$_2$Cl$_7$]—), decachlorotrigallate ([Ga$_3$Cl$_{10}$]—), trichloroplumbate ([PbCl$_3$]—), pentachloridoindate ([InCl$_5$]$^{2-}$), tetrachlorozincate ([ZnCl$_4$]$^{2-}$), hexachlorodizincate ([Zn$_2$Cl$_6$]$^{2-}$), hexachlorotitanate ([TiCl$_6$]$^{2-}$), hexachlorozirconate ([ZrCl$_6$]$^{2-}$), decachlorodizirconate ([Zr$_2$Cl$_{10}$]$^{2-}$), hexachlorohafnate ([HfCl$_6$]$^{2-}$), decachlorodihafnate ([Hf$_2$Cl$_{10}$]$^{2-}$), tetrachloromanganate ([MnCl$_4$]$^{2-}$), tetrachloroferrate ([FeCl$_4$]$^{2-}$), tetrachlorocobaltate ([CoCl$_4$]$^{2-}$), tetrachloronicklate ([NiCl$_4$]$^{2-}$), tetrachloropaladate ([PdCl$_4$]$^{2-}$), tetrachloroplatinate ([PtCl$_4$]$^{2-}$), tetrachlorocuprate ([CuCl$_4$]$^{2-}$), octachlorotrizincate ([Zn$_3$Cl$_8$]$^{2-}$), decachlorotetrazincate ([Zn$_4$Cl$_{10}$]$^{2-}$), tetrachlorocadmate ([CdCl$_4$]$^{2-}$), hexachlorodicadmate ([Cd$_2$Cl$_6$]$^{2-}$), tetrachloromercurate ([HgCl$_4$]$^{2-}$), or tetrachloroplumbate ([PbCl$_4$]$^{2-}$).

As noted above, the phase of the ordered structure may be controlled by replacing hydrogen (H) atoms within the chain of hydrocarbons with larger functional groups (e.g., methyl groups, ethyl groups, n-propyl groups, so-propyl groups, etc.) prior to depositing the solution onto the surface of the substrate. In some embodiments, the phase of the ordered structure may be controlled by replacing the hydrogen (H) atoms with methyl (CH$_3$) groups prior to depositing the solution onto the surface of the substrate. Replacing the hydrogen (H) atoms with methyl (CH$_3$) groups changes the phase of the ordered structure by: (a) increasing a separation between the alkyl tail groups in the tail groups of the ordered structure, and (b) changing an orientation of the alkyl tail groups in the tail groups of the ordered structure.

In some embodiments, the ILCs may self-assemble on the surface of the substrate to form a nanopore/rod structure having alternating head groups and tail groups. In such embodiments, the cation head groups and the anions of the ILCs may segregate to the head groups to form a plurality of rods within the nanopore/rod structure, with the alkyl tail groups oriented around the plurality of rods. In some embodiments, the plurality of rods may be evenly distributed within the nanopore/rod structure with equal spacing between each of the plurality of rods. For example, when 1-dodecyl-3-methylimidazolium tetrafluoroborate ILCs are used in the method described above, the plurality of rods may be spaced approximately 3 nm apart, and each rod may have a diameter of approximately 1 nm.

According to one embodiment, a method is provided herein to form a self-assembled ionic liquid crystal (ILC) structure on a substrate. The method may generally begin by providing a solution comprising ionic liquid crystals (ILCs) having imidazolium-based cation head groups, anions and alkyl tail groups. Each alkyl tail group may include a chain of hydrocarbons, wherein each hydrocarbon in the chain of hydrocarbons comprises a plurality of methyl groups (CH$_3$) bound to a carbon (C) atom. The method may further include depositing the solution onto a surface of the substrate. Once deposited, the ILCs may self-assemble on the surface of the substrate to form a nanopore/rod structure having alternating head groups and tail groups. The imidazolium-based cation head groups and the anions of the ILCs segregate to the head groups to form a plurality of rods within the nanopore/rod structure, with the alkyl tail groups oriented around the plurality of rods.

According to yet another embodiment, a self-assembled ionic liquid crystal (ILC) structure formed on a substrate via self-assembly of ionic liquid crystals (ILCs) is provided herein. The ILCs used to form the self-assembled ILC structure may generally include imidazolium-based cation head groups, anions and alkyl tail groups. The alkyl tail groups of the ILCs may each comprise a chain of hydrocarbons, wherein each hydrocarbon in the chain of hydrocarbons comprises a plurality of methyl groups (CH$_3$) bound to a carbon (C) atom. The ILCs self-assemble on a surface of the substrate to form a nanopore/rod structure having alternating head groups and tail groups. The imidazolium-based cation head groups and the anions of the ILCs segregate to the head groups to form a plurality of rods within the nanopore/rod structure, with the alkyl tail groups oriented around the plurality of rods.

The ILCs used in the method and self-assembled ILC structure described above may include a wide variety of imidazolium-based cation head groups. For example, the ILCs may include imidazolium-based cation head groups of the form: 1-R$_1$-3-R$_2$-imidazolium, where R$_1$ is an alkyl chain with a chain length ranging from 8-18 hydrocarbons, and R$_2$ is a hydrogen, methyl, ethyl, propyl, butyl, substituted or unsubstituted phenyl, or other hydrocarbon group. In some embodiments, 1-dodecyl-3-methylimidazolium cation head groups may be used.

The ILCs used in the method and self-assembled ILC structure described above may also include a wide variety of anions. For example, the anions may comprise tetrafluoroborate (BF$_4^-$), chloride (Cl$^-$), acetate (CH$_3$COO$^-$), hexafluorophosphate (PF$_6^-$), trifluoromethyl acetate (C$_3$H$_3$F$_3$O$_2^-$), nitrate (NO$_3^-$), dicyanamide (C$_2$HN$_3^-$), tetracyanoborate (B(CN)$_4^-$), trifluoromethane sulfonate (CF$_3$O$_3$S$^-$), bis((trifluoromethyl)sulfonyl)imdide ([(CF$_3$SO$_2$)$_2$N]$^-$), tetrachloroaluminate ([AlCl$_4$]$^-$), heptachlorodialuminate ([Al$_2$Cl$_7$]$^-$), decachlorotrialuminate ([Al$_3$Cl$_{10}$]$^-$), tridecachlorotetraaluminate ([Al$_4$Cl$_{13}$]$^-$), tetrachloroferrate (Cl$_4$Fe$^-$), trichlorostannate ([SnCl$_3$]$^-$), pentachlorodistannate ([Sn$_2$Cl$_5$]$^-$), tetrachloroindate ([InCl$_4$]—), nonachlorodititanate ([Ti$_2$Cl$_9$]—), nonachlorodizirconate ([Zr$_2$Cl$_9$]—), nonachlorodihafnate ([Hf$_2$Cl$_9$]—), tetrachloroaurate ([AuCl$_4$]—), tetrachlorogallate ([GaCl$_4$]—), heptachlorodigallate ([Ga$_2$Cl$_7$]—), decachlorotrigallate ([Ga$_3$Cl$_{10}$]—), trichloroplumbate ([PbCl$_3$]—), pentachloridoindate ([InCl$_5$]$^{2-}$), tetrachlorozincate ([ZnCl$_4$]$^{2-}$), hexachlorodizincate ([Zn$_2$Cl$_6$]$^{2-}$), hexachlorotitanate ([TiCl$_6$]$^{2-}$), hexachlorozirconate ([ZrCl$_6$]$^{2-}$), decachlorodizirconate ([Zr$_2$Cl$_{10}$]$^{2-}$), hexachlorohafnate ([HfCl$_6$]$^{2-}$), decachlorodihafnate ([Hf$_2$Cl$_{10}$]$^{2-}$), tetrachloromanganate ([MnCl$_4$]$^{2-}$), tetrachloroferrate ([FeCl$_4$]$^{2-}$), tetrachlorocobaltate ([CoCl$_4$]$^{2-}$), tetrachloronicklate ([NiCl$_4$]$^{2-}$), tetrachloropaladate ([PdCl$_4$]$^{2-}$), tetrachloroplatinate ([PtCl$_4$]$^{2-}$), tetrachlorocuprate ([CuCl$_4$]$^{2-}$), octachlorotrizincate ([Zn$_3$Cl$_8$]$^{2-}$), decachlorotetrazincate ([Zn$_4$Cl$_{10}$]$^{2-}$), tetrachlorocadmate ([CdCl$_4$]$^{2-}$), hexachlorodicadmate ([Cd$_2$Cl$_6$]$^{2-}$), tetrachloromercurate ([HgCl$_4$]$^{2-}$), or tetrachloroplumbate ([PbCl$_4$]$^{2-}$). In one example embodiment, 1-dodecyl-3-methylimidazolium tetrafluoroborate ILCs may be used.

In some embodiments, the plurality of rods may be evenly distributed within the nanopore/rod structure with equal spacing between each of the plurality of rods. When 1-dodecyl-3-methylimidazolium tetrafluoroborate ILCs are used, the plurality of rods may be spaced approximately 3 nm apart, and each rod may have a diameter of approximately 1 nm. It is noted that the diameter of, and spacings between, the plurality of rods are exemplary and that utilization other imidazolium-based ILCs having different alkyl chain lengths and/or different anions may result in alternative diameters and/or inter-rod spacings.

As noted above and described further herein, the present disclosure provides various embodiments of methods for forming a self-assembled ionic liquid crystal (ILC) structure on a substrate, as well as methods for controlling the phase of a self-assembled ILC structure formed on a substrate. Of course, the order of discussion of the different steps as described herein has been presented for the sake of clarity. In general, these steps can be performed in any suitable order. Additionally, although each of the different features, techniques, configurations, etc., herein may be discussed in different places of this disclosure, it is intended that each of the concepts can be executed independently of each other or in combination with each other. Accordingly, the present invention can be embodied and viewed in many different ways.

Note that this Summary section does not specify every embodiment and/or incrementally novel aspect of the present disclosure or claimed inventions. Instead, the summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

A more complete understanding of the present inventions and advantages thereof may be acquired by referring to the following description taken in conjunction with the accompanying drawings, in which like reference numbers indicate like features. It is to be noted, however, that the accompanying drawings illustrate only exemplary embodiments of the disclosed concepts and are therefore not to be considered limiting of the scope, for the disclosed concepts may admit to other equally effective embodiments. It is further noted that the patent or application file contains at least one drawing executed in color. Copies of this patent or patent application publication with color drawing(s) will be provided by the Office upon request and payment of the necessary fee.

DETAILED DESCRIPTION

Figure 1A:
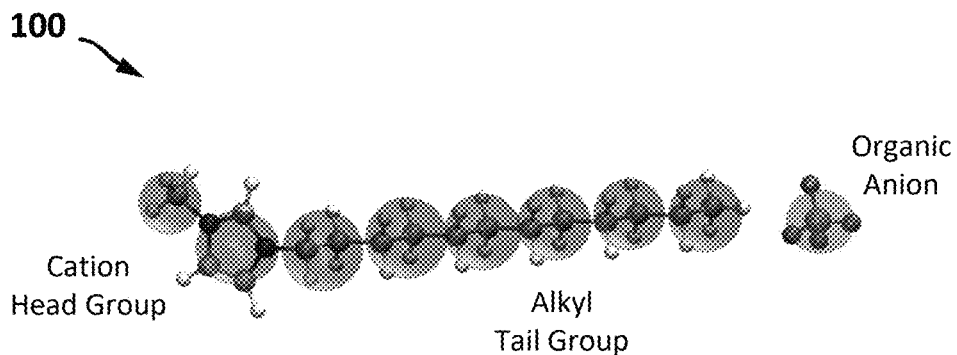
FIG. 1A is a mapping of coarse grain particles of an example ionic liquid crystal (ILC) molecule.
Figure 1B:
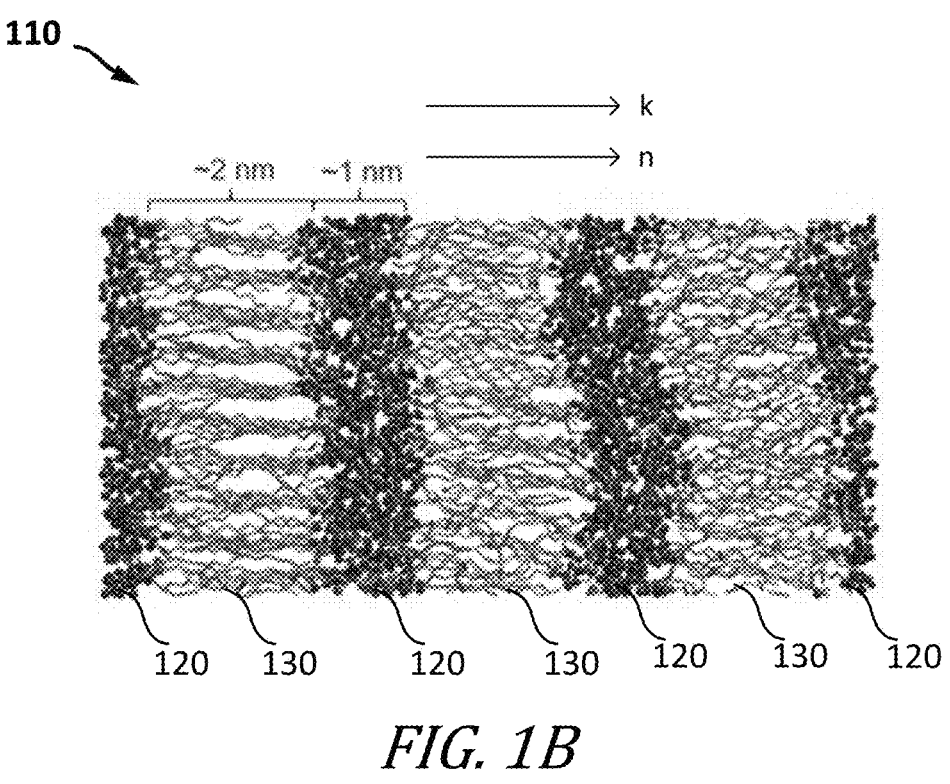
FIG. 1B illustrates one example of an ordered structure (i.e., a layered structure) formed by direct self-assembly (DSA) of the ILC molecules shown in FIG. 1A.

Ionic liquid crystals (ILCs) self-assemble into solid (crystalline phase) ordered structures at or near room temperature. The difference in polarity between the cation head groups and the alkyl tail groups of the ILCs promote direct self-assembly of ILC molecules by segregating the head and tail groups into ordered structures, with the cation head groups and anions segregating to the head groups and the alkyl tail groups segregating to the tail groups. It is generally well-known that the orientation and pitch of an ordered structure can be controlled by controlling the deposition temperature, the chain length of the alkyl tail groups included within the ILCs used to form the ordered structure and the hydrophobicity of the guide surface(s) upon which the ILCs are deposited, such as the underlying substrate surface and/or the sidewalls of a larger template pattern.

As noted above in the Background section, ILCs are known to self-assemble into a wide variety of ordered phases (or "mesophases"), including nematic (N), smectic (Sm), columnar (Col) and cubic (Cub) phases. A mesophase is an intermediate state between the perfectly ordered crystalline and the disordered liquid state. Mesophase formation in ILCs is thought to be primarily controlled by van der Walls interactions between the alkyl chains, dipole-dipole, cation-TT interactions, IT-TT stacking, as well as the hydrogen bonding between the anions and cations of the ILCs. Mesophase formation has been observed in a wide variety of ILCs by choosing an alkyl chain, which is long enough to enhance the van der Walls forces between the alkyl tails and induce mesophase formation. For example, it has been found that imidazolium-based ILCs exhibit a mesophase when at least one sufficiently long alkyl chain is attached to a nitrogen (N) atom on the imidazolium cation. Specifically, imidazolium-based ILCs are known to exhibit SmA mesophases comprising periodic stacks of two-dimensional (2D) alternating layers of head group layers and tail group layers. In addition to alkyl chain length, the choice of anion has also been shown to affect the mesogenic properties of the self-assembled ILC structure.

New methods are provided in the present disclosure for controlling the phase of an ordered structure formed on a substrate surface via self-assembly of ILCs. In the disclosed embodiments, the phase of an ordered structure is controlled by replacing the hydrogen (H) atoms of the hydrocarbons included the alkyl chain with larger sized functional groups. Adding larger sized functional groups to the alkyl chain changes the phase of the ordered structure by: (a) increasing the separation between the hydrophilic (cation) and hydrophobic (alkyl tail) groups of the ILCs, and (b) changing the orientation of alkyl tails within the tail groups of the self-assembled ILCs.

In some embodiments, the methods disclosed herein can be used to change the phase of an ordered structure formed on a substrate surface via self-assembly of 1-dodecyl-3-methylimidazolium tetrafluoroborate ($[C_{12}mim][BF_4^-]$) ILCs. By replacing the H atoms in the alkyl chain of $[C_{12}mim][BF_4^-]$ ILCs with $CH_3$ groups, the techniques described herein randomize the orientation of alkyl tails within the tail groups of the self-assembled ILCs to change the phase of the ordered structure, thereby changing the ordered structure from a layered structure to nanopore/rod structure. It is noted, however, that the methods disclosed herein are not limited to $[C_{12}mim][BF_4^-]$ ILCs and may be used to control the phase of ordered structures formed via self-assembly of other ILCs, possibly having different cations, anions and/or alkyl tail groups.

Figure 2:
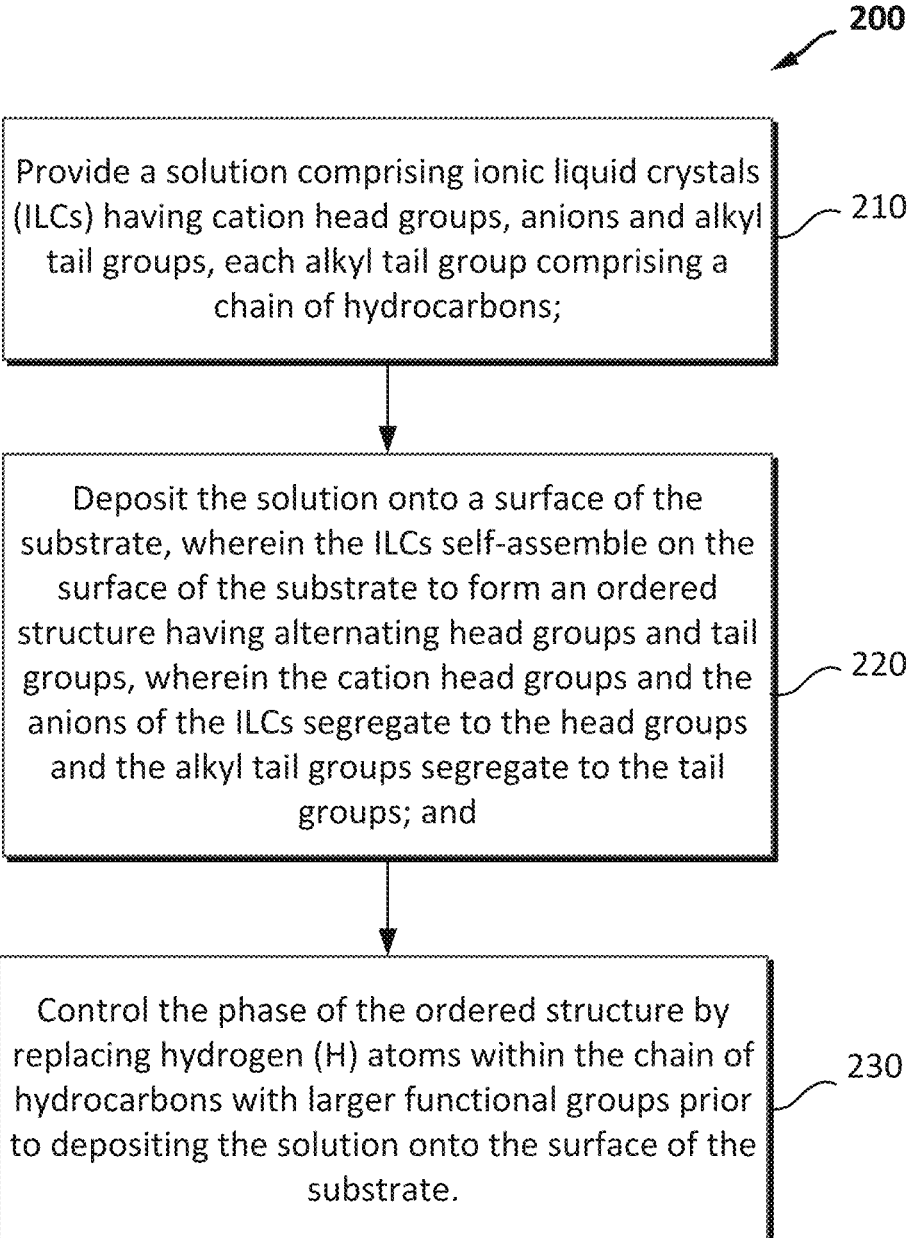
FIG. 2 is a flowchart diagram illustrating a method that may be used to control a phase of a self-assembled ILC structure formed on a substrate in accordance with one embodiment of the present disclosure.

FIG. 2 illustrates one embodiment of a method 200 that uses the techniques disclosed herein to control a phase of a self-assembled ILC structure formed on a substrate. It will be recognized that the embodiment of the method 200 shown in FIG. 2 is merely exemplary and additional methods may utilize the techniques described herein. Further, additional processing steps may be added to the method 200 shown in FIG. 2 as the steps described are not intended to be exclusive. Moreover, the order of the steps is not limited to the order shown in the figure as different orders may occur and/or various steps may be performed in combination or at the same time.

The method 200 includes providing a solution comprising ionic liquid crystals (ILCs) having cation head groups, anions and alkyl tail groups, each alkyl tail group comprising a chain of hydrocarbons (in step 210) and depositing the solution onto a surface of a substrate (in step 220). Once deposited in step 210, the ILCs self-assemble on the surface of the substrate to form an ordered structure having alternating head groups and tail groups, with the cation head groups and the anions of the ILCs segregated to the head groups and the alkyl tail groups segregated to the tail groups. The method 200 further includes controlling the phase of the ordered structure by replacing the hydrogen (H) atoms within the chain of hydrocarbons with larger molecules (in step 230) before the solution is deposited onto the surface of the substrate (in step 220).

The ILCs used in the method 200 may include a wide variety of cation head groups. For example, the ILCs may include imidazolium, pyrazolium, pyrrolidinium, pyridinium, piperidinium, morpholinium, ammonium, phosphonium, sulphonium or cholinium-based cation head groups. In some embodiments, the ILCs may include an imidazolium-based cation head group of the form: $1-R_1-3-R_2$-imidazolium, where $R_1$ is an alkyl chain with a chain length ranging from 8-18 hydrocarbons, and $R_2$ is a hydrogen, methyl, ethyl, propyl, butyl, substituted or unsubstituted phenyl, or other hydrocarbon group.

In one example embodiment, the ILCs used in the method 200 may include a 1-dodecyl-3-methylimidazolium-based cation head group (otherwise referred to as C12mim), which is a monovalent cation (i.e., a cation having a +1 charge) head group having an aromatic ring with an alkyl chain of 12 hydrocarbons covalently bound to the N1 position and a methyl group covalently bound to the N3 position of the aromatic ring. It is noted, however, that ILCs having imidazolium-based cation head groups with different alkyl chain lengths can also be provided within the solution. For example, imidazolium-based ILCs having anywhere from 8 hydrocarbons (C8mim) to 18 hydrocarbons (C18mim) in the alkyl chain can be used. It is further noted that ILCs with other cation head groups with potentially different valences and/or alkyl chain lengths may also be provided within the solution.

The ILCs used in the method 200 may also include a wide variety of anions, including monovalent anions (i.e., anions having a –1 charge), divalent anions (i.e., anions having a –2 charge) or trivalent anions (i.e., anions having a –3 charge). The anions included within the ILCs may be organic anions or metalate anions.

In some embodiments, ILCs having monovalent cation head groups and monovalent anions may be used in the method 200 to provide the ILCs with a 1:1 cation/anion charge ratio. Examples of monovalent anions that may be included within the ILCs include, but are not limited to, tetrafluoroborate ($BF_4^-$), chloride ($Cl^-$), acetate ($CH_3COO^-$), hexafluorophosphate ($PF_6^-$), trifluoromethyl acetate ($C_3H_3F_3O_2^-$), nitrate ($NO_3^-$), dicyanamide ($C_2HN_3^-$), tetracyanoborate ($B(CN)_4^-$), trifluoromethane sulfonate ($CF_3O_3S^-$), bis((trifluoromethyl)sulfonyl)imdide ($[(CF_3SO_2)_2N]^-$), tetrachloroaluminate ($[AlCl_4]^-$), heptachlorodialuminate ($[Al_2Cl_7]^-$), decachlorotrialuminate ($[Al_3Cl_{10}]^-$), tridecachlorotetraaluminate ($[Al_4Cl_{13}]^-$), tetrachloroferrate ($Cl_4Fe^-$), trichlorostannate ($[SnCl_3]^-$), pentachlorodistannate ($[Sn_2Cl_5]^-$), tetrachloroindate ($[InCl_4]$—), nonachlorodititanate ($[Ti_2Cl_9]$—), nonachlorodizirconate ($[Zr_2Cl_9]$—), nonachlorodihafnate ($[Hf_2Cl_9]$—), tetrachloroaurate ($[AuCl_4]$—), tetrachlorogallate ($[GaCl_4]$—), heptachlorodigallate ($[Ga_2Cl_7]$—), decachlorotrigallate ($[Ga_3Cl_{10}]$—), and trichloroplumbate ($[PbCl_3]$—).

In other embodiments, ILCs having monovalent cation head groups and divalent anions (or trivalent anions) may be used in the method 200 to provide the ILCs with a 1:2 cation/anion charge ratio (or a 1:3 cation/anion charge ratio). Examples of divalent anions that may be included within the ILCs include, but are not limited to, pentachloridoindate ($[InCl_5]^{2-}$), tetrachlorozincate ($[ZnCl_4]^{2-}$), hexachlorodizincate ($[Zn_2Cl_6]^{2-}$), hexachlorotitanate ($[TiCl_6]^{2-}$), hexachlorozirconate ($[ZrCl_6]^{2-}$), decachlorodizirconate ($[Zr_2Cl_{10}]^{2-}$), hexachlorohafnate ($[HfCl_6]^{2-}$), decachlorodihafnate ($[Hf_2Cl_{10}]^{2-}$), tetrachloromanganate ($[MnCl_4]^{2-}$), tetrachloroferrate ($[FeCl_4]^{2-}$), tetrachlorocobaltate ($[CoCl_4]^{2-}$), tetrachloronicklate ($[NiCl_4]^{2-}$), tetrachloropalladate ($[PdCl_4]^{2-}$), tetrachloroplatinate ($[PtCl_4]^{2-}$), tetrachlorocuprate ($[CuCl_4]^{2-}$), octachlorotrizincate ($[Zn_3Cl_8]^{2-}$), decachlorotetrazincate ($[Zn_4Cl_{10}]^{2-}$), tetrachlorocadmate ($[CdCl_4]^{2-}$), hexachlorodicadmate ($[Cd_2Cl_6]^{2-}$), tetrachloromercurate ($[HgCl_4]^{2-}$), and tetrachloroplumbate ($[PbCl_4]^{2-}$). Hexachloridoindate ($[InCl_6]^{3-}$) is one example of a trivalent anion that may be included within the ILCs. In some cases, ILCs having monovalent cation head groups and divalent anions (or trivalent anions) may be used in the method 200 to increase the pitch of the ordered structure formed in step 220 by preventing the alkyl tail groups from interdigitating within the tail groups of the ordered structure.

In yet other embodiments, the ILCs used in the method 200 may be metalate salt ILCs having metalate anions. As known in the art, a metalate anion (or "metalate") is a complex anion containing a metal ligated to several atoms or small groups. A metalate anion can include any metal and a wide variety of ligands. Examples of metals that may be included within a metalate anion include transition metals (such as, e.g., iron (Fe), copper (Cu), cobalt (Co), Zinc (Zn), Cadmium (Cd), etc.), post-transition metals (such as, e.g., aluminum (Al), indium (In), tin (Sn), lead (Pb), bismuth (Bi), etc.) and lanthanides (such as, e.g., cerium (Ce), neodymium (Nd), samarium (Sm), etc.). Examples of ligands that may be included within a metalate anion include oxo, halo, cyano (CN), thiocyano (SCN), nitrato, sulfato, phosphato, phosphine, trifluoromethane sulfonate, sulfo and carbonato ligands. In some embodiments, chlorometalate anions may be used to form metalate salt ILCs. Examples of chlorometalate anions that may be used to form metalate salt ILCs include, but are not limited to, chloroaluminate anions (such as, e.g., $[AlCl_4]^-$, $[Al_2Cl_7]—$, $[Al_3Cl_{10}]—$, $[Al_4Cl_{13}]—$, etc.), chloroferrate anions (such as, e.g., $Cl_4Fe^-$), chlorostannate anions (such as, e.g., $[SnCl_3]—$ $[Sn_2Cl_5]—$, etc.), chloroindate anions (such as, e.g., $[InCl_6]^{3-}$, $([InCl_5]^{2-}$, $[InCl_4]—$, etc.), and chlorozincate anions (such as, e.g., $[ZnCl_4]^{2-}$, $[Zn_2Cl_6]^{2-}$, $[Zn_3Cl_8]^{2-}$, etc.).

As noted above, the phase of the ordered structure is controlled in step 230 by replacing hydrogen (H) atoms within the chain of hydrocarbons with larger functional groups prior to depositing the solution onto the surface of the substrate in step 220. In some embodiments, the phase of the ordered structure may be controlled in step 230 by replacing the H atoms with methyl ($CH_3$) groups prior to depositing the solution onto the surface of the substrate in step 220. Replacing the H atoms with larger $CH_3$ groups adds bulk to the alkyl chain and prevents the alkyl tail groups from interdigitating within the tail groups of the ordered structure. In addition to increasing the separation between the alkyl tail groups, adding $CH_3$ groups to the alkyl chain changes the orientation of the alkyl tail groups within the tail groups of the ordered structure, which changes the phase of the ordered structure.

A wide variety of techniques can be used to replace the H atoms with $CH_3$ groups in step 230. For example, it is generally well known that imidazolium molecules can be synthesized by reacting methylimidazole with an alkyl bromide (such as, e.g., $[BF_4]^-$) at elevated temperature to produce 1-alkyl-3-methylimidazolium bromide. Ion exchange can be used to make imidazolium salts with other anions. To synthesize an ILC having $CH_3$ functional groups in the alkyl chain, instead of hydrogen atoms, methylimidazole can be reacted with a methylated alkyl bromide (such as, e.g. 2-bromo-2,3,3,4,4,5,5,6,6,7,7,8,8,9,9,10,10,11,11, 12,12-icosihenamethyltridecane) at elevated temperature to produce an ILC-$CH_3$ based off of $C_{12}$mim.

Figure 3A:
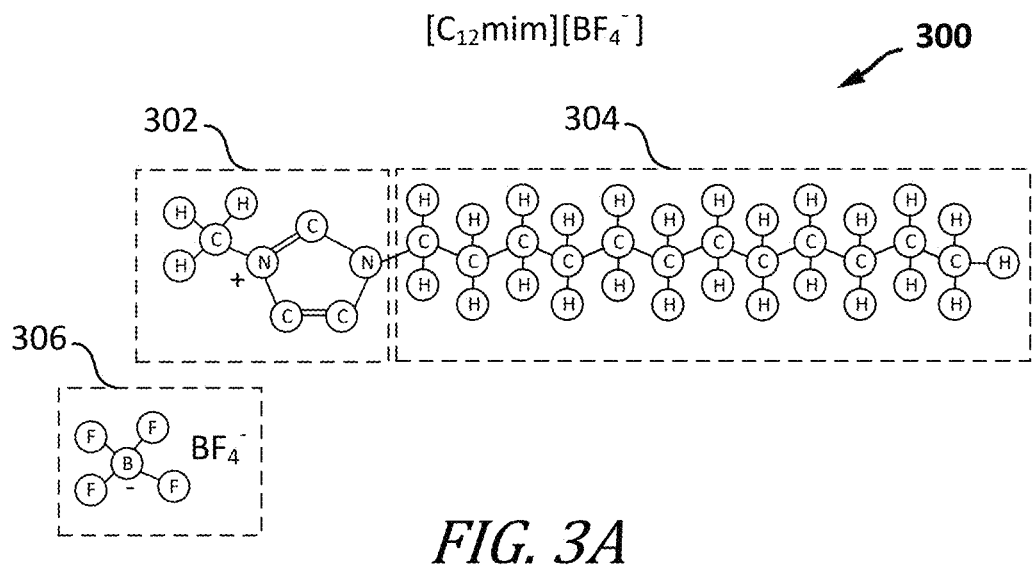
FIG. 3A depicts the chemical structure of an example ILC molecule (e.g., $[C_{12}mim][BF_4^-]$: 1-dodecyl-3-methylimidazolium tetrafluoroborate).

In some embodiments, the method 200 shown in FIG. 2 may be used to control the phase of an ordered structure formed via self-assembly of imidazolium-based ILCs. FIG. 3A illustrates the chemical structure of an example ILC 300 ($[C_{12}$mim]$[BF_4^-]$) having an imidazolium cation head group 302 ($[C_{12}$mim]) covalently bound to an alkyl chain of hydrocarbons 304 and a monovalent anion 306 ($[BF_4^-]$). In the ILC 300, the imidazolium cation head group 302 comprises an aromatic ring with an alkyl chain of hydrocarbons 304 covalently bound to the N1 position, and a methyl ($CH_3$) group covalently bound to the N3 position of the aromatic ring. In the example shown in FIG. 3A, the alkyl chain of hydrocarbons 304 includes 11 methylene ($CH_2$) groups with covalent bonds between the carbon (C) atoms of the $CH_2$ groups and one terminal methyl ($CH_3$) group covalently bound through the carbon atom. Although 12 hydrocarbons are explicitly shown in FIG. 3A, imidazolium-based ILCs having different alkyl chain lengths (e.g., $[C_8$mim] . . . $[C_{18}$mim]) and/or different anions may also be used in the method 200.

Figure 3B:
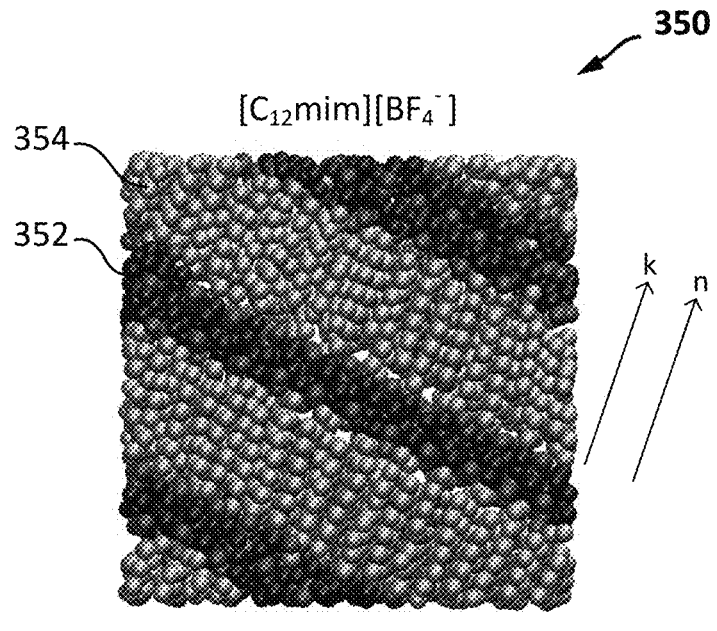
FIG. 3B provides a course-grain simulation of an ordered structure (i.e., a layered structure) formed by DSA of the ILC molecule shown in FIG. 3A.

FIG. 3B illustrates an ordered structure formed by direct self-assembly (DSA) of the ILCs 300 shown in FIG. 3A. As shown in FIG. 3B, the ILCs 300 self-assemble into a layered structure 350 having alternating layers of head group layers 352 and tail group layers 354, with the cation head groups and the anions of the ILCs segregated to the head group layers 352 and the alkyl tail groups segregated to the tail group layers 354. Pairing a monovalent anion (such as, e.g., $[BF_4^-]$) with a monovalent cation head group of sufficient alkyl chain length (such as, e.g., $[C_{12}$mim]) allows the self-assembled ILCs 300 to form a layered structure 350 having interdigitated alkyl tails in the tail group layers 354 and an SmA mesophase.

Figure 4A:
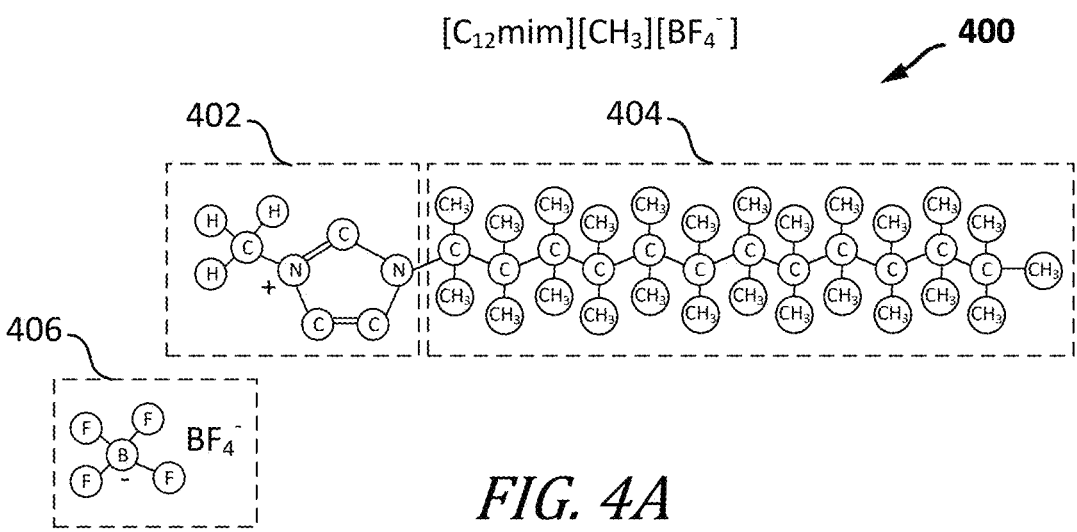
FIG. 4A depicts the chemical structure of the ILC molecule shown in FIG. 3A after replacing the hydrogen (H) atoms in the alkyl chain with methyl ($CH_3$) groups.

In some embodiments of the method 200, the H atoms in the alkyl chain of hydrocarbons 304 may be replaced with $CH_3$ groups in step 230 to form an ILC 400 as shown in FIG. 4A. FIG. 4A illustrates the chemical structure of an example ILC 400 ($[C_{12}$mim]$[CH_3][BF_4^-]$) having an imidazolium cation head group 402 ($[C_{12}$mim]) covalently bound to an alkyl chain of hydrocarbons 404 and a monovalent anion 406 ($[BF_4^-]$). Like the ILC 300, the imidazolium cation head group 402 of the ILC 400 comprises an aromatic ring with an alkyl chain of hydrocarbons 404 covalently bound to the N1 position, and a $CH_3$ group covalently bound to the N3 position of the aromatic ring. As noted above and described in more detail below, the $CH_3$ groups added to the alkyl chain prevent the alkyl tails from interdigitating and change the orientation of alkyl tails during self-assembly of the ILCs 400.

Figure 4B:
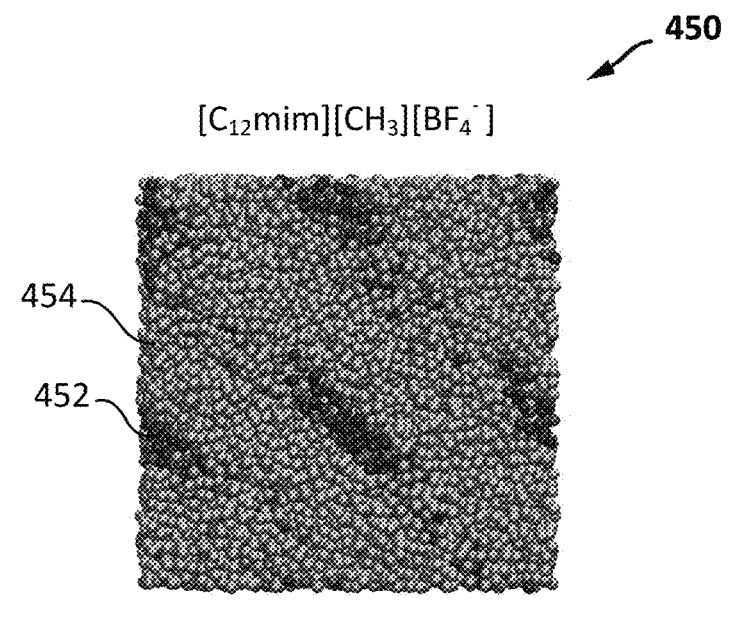
FIG. 4B provides a course-grain simulation of an ordered structure (i.e., a nanopore/rod structure) formed by DSA of the ILC molecule shown in FIG. 4A.

FIG. 4B illustrates an ordered structure formed by direct self-assembly (DSA) of the ILCs 400 shown in FIG. 4A. As shown in FIG. 4B, the ILCs 400 self-assemble into a nanopore/rod structure 450 having alternating head groups 452 and tail groups 454, with the cation head groups and the anions of the ILCs 400 segregated to the head groups 452 to form the rods within the nanopore/rod structure 450. The alkyl tail groups of the ILCs 400 are segregated to the tail groups 454 and oriented around the rods.

Figure 5A:
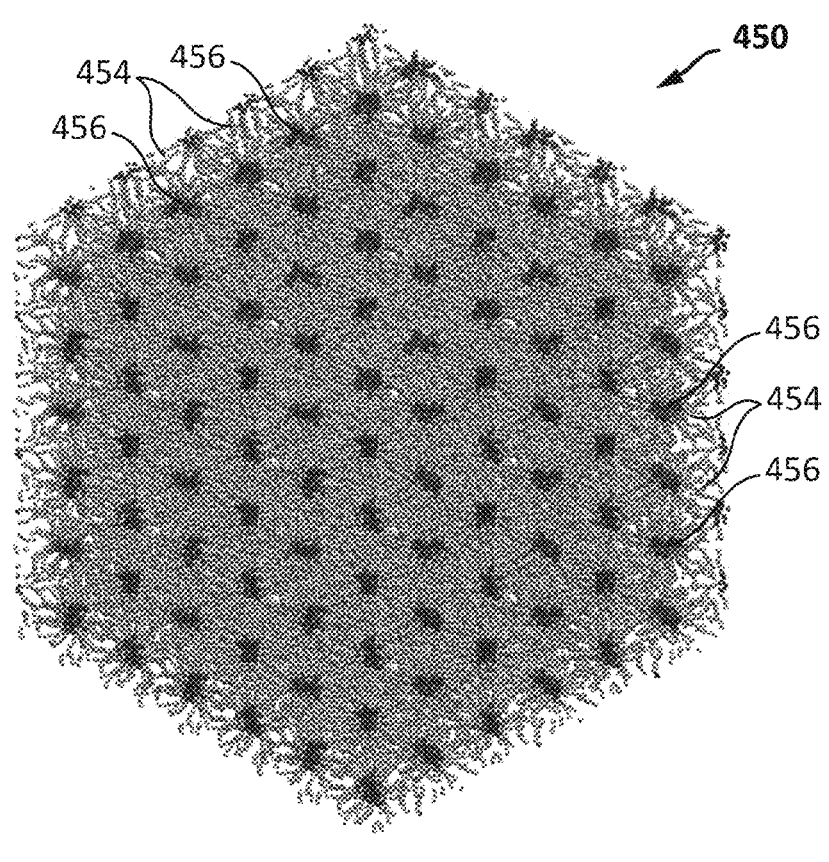
FIGS. 5A-5B provide a top view (FIG. 5A) and side view (FIG. 5B) of the nanopore/rod structure formed by DSA of the ILC molecule shown in FIG. 4A.
Figure 5B:
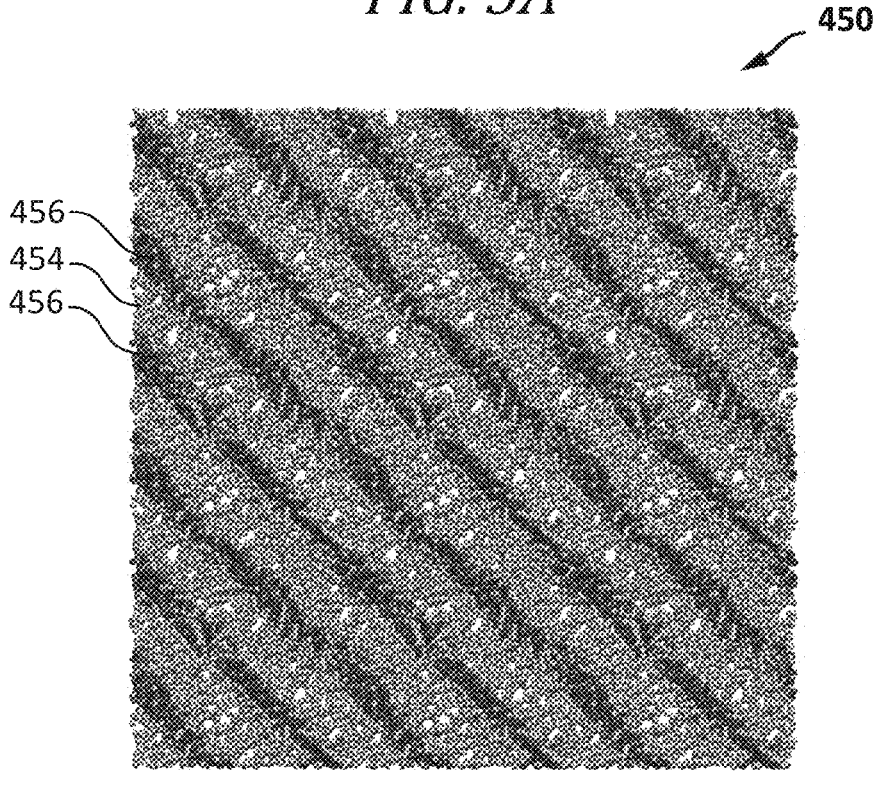
Figure 5C:
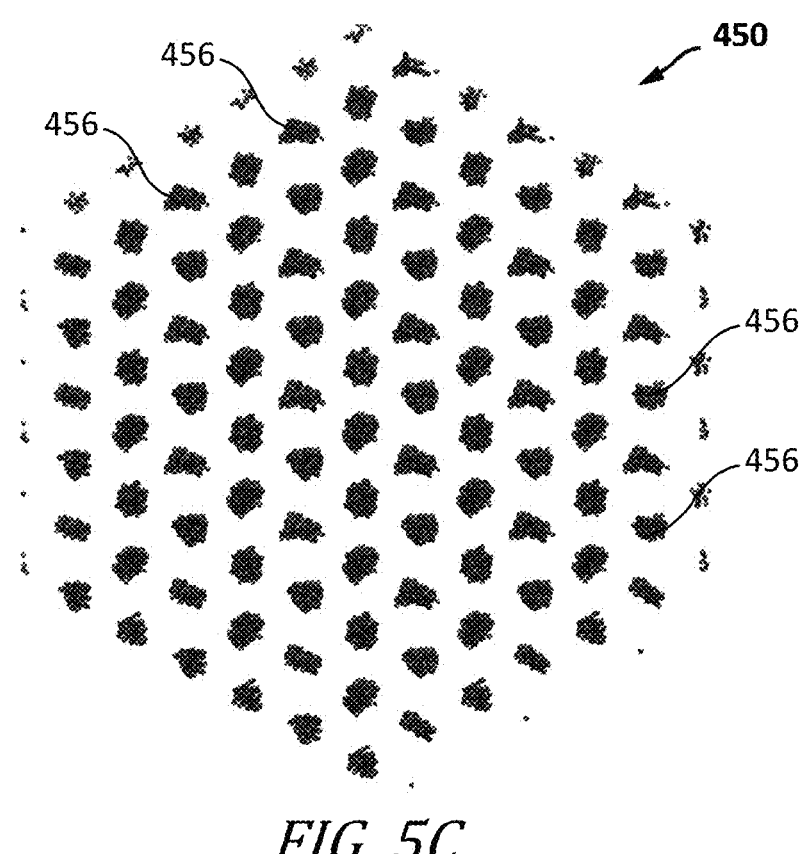
FIGS. 5C-5D provide additional views of the plurality of rods included within the nanopore/rod structure shown in FIGS. 5A-5B.
Figure 5D:
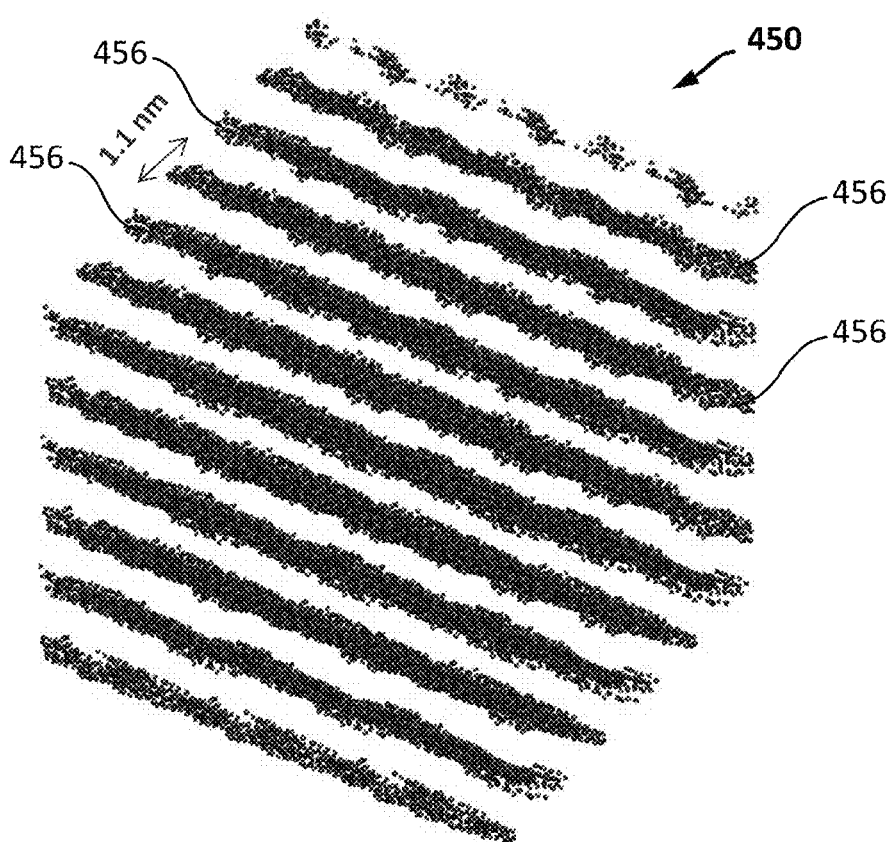
Figure 5E:
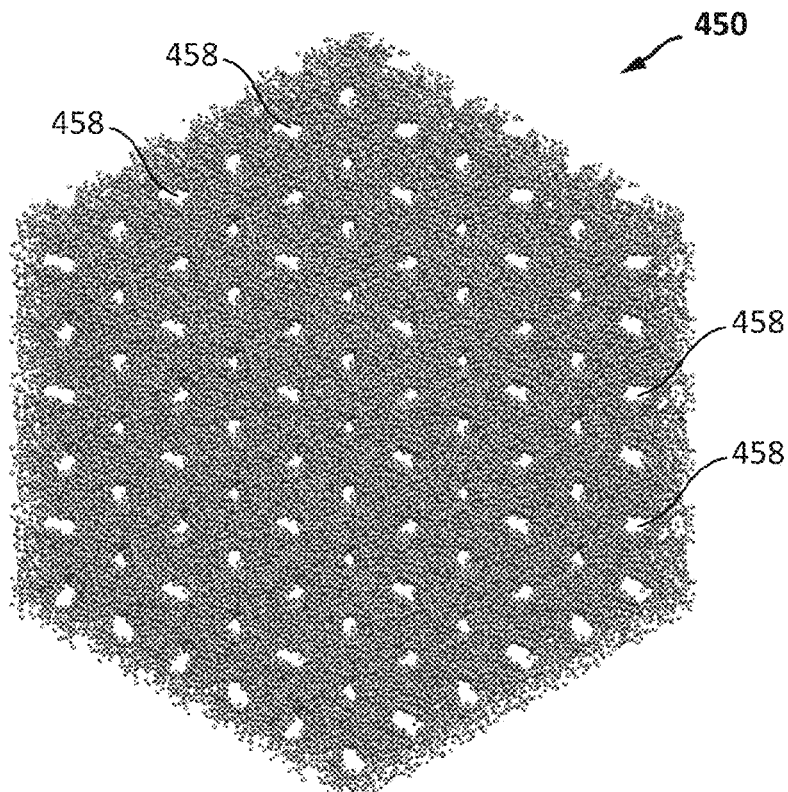
FIG. 5E provides a top view of the nanopores included within the nanopore/rod structure shown in FIGS. 5A-5B.

FIGS. 5A-5B provide additional views of the nanopore/ rod structure 450 formed by DSA of the ILCs 400 shown in FIG. 4A. In the top view shown in FIG. 5A, the nanopore/ rod structure 450 is depicted as a three-dimensional (3D) structure with a plurality of rods 456 extending through the 3D structure. A side view of the nanopore/rod structure 450 is shown in FIG. 5B. As shown in FIGS. 5A-5B, the alkyl tails within the tail groups 454 of the nanopore/rod structure 450 are not interdigitated and aligned, as in the layered structure 350 shown in FIG. 3B. Instead, the alkyl tails within the tail groups 454 are separated and distributed somewhat randomly around the plurality of rods 456. FIGS. 5C-5E provide additional views of the plurality of rods 456 and nanopores 458 included within the nanopore/rod struc- ture 450. As shown in FIGS. 5A-5D, the plurality of rods 456 are evenly distributed within the nanopore/rod structure 450 with equal spacing between each of the plurality of rods 456. The spacing between the rods is dependent, at least in part, on the alkyl chain length.

Figure 5F:
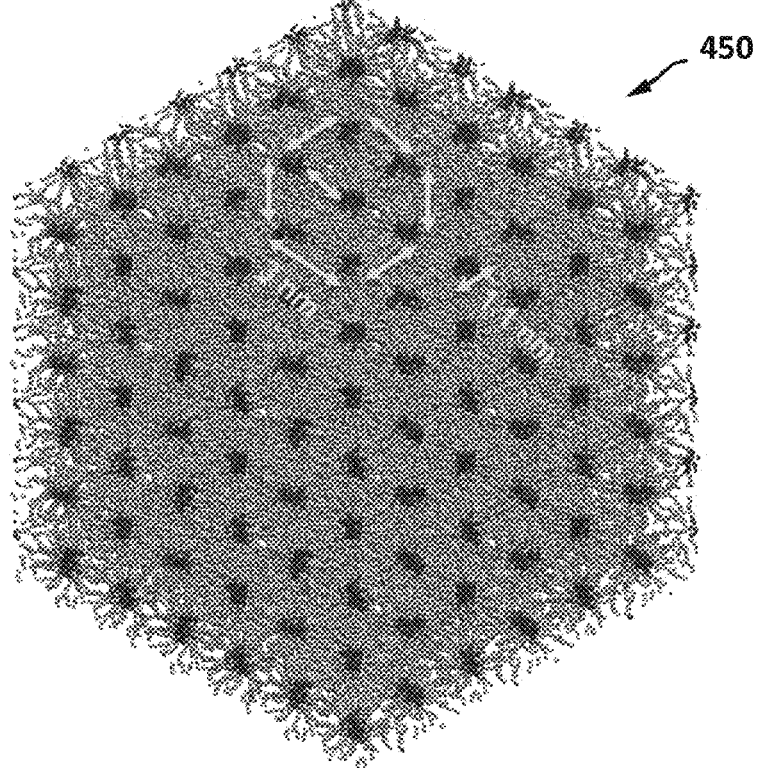
FIG. 5F provides a top view of the nanopore/rod structure shown in FIG. 5B, illustrating the even distribution of a plurality of rods formed via self-assembly of the ILCs shown in FIG. 4A.

FIG. 5F provides a top view of the nanopore/rod structure 450 shown in FIG. 5B, illustrating the even distribution of the rods 456 formed via self-assembly of the $[C_{12}$mim] $[CH_3][BF_4^-]$ ILCs 400 shown in FIG. 4A. When $[C_{12}$mim] $[CH_3][BF_4^-]$ ILCs self-assemble on a substrate surface, the cation head groups and anions segregate to the head groups 452 to form a plurality of rods 456, which are evenly distributed within the nanopore/rod structure 450. In the embodiment shown in FIG. 5F, each of the plurality of rods 456 has a diameter of about 1.1 nm and are spaced about 3 nm apart. It is noted that the diameter of, and spacings between, the rods 456 shown in FIG. 5F are exemplary and that utilization other imidazolium-based ILCs having differ- ent alkyl chain lengths and/or different anions may result in alternative diameters and/or inter-rod spacings.

As shown in the comparison of FIG. 3B and FIGS. 5A-5F, replacing the hydrogen (H) atoms in the alkyl chain with methyl (CH$_3$) groups in step 230 of the method 200 shown in FIG. 2 changes the phase of the ordered structure by: (a) increasing the separation between the alkyl tail groups in the tail groups of the ordered structure, and (b) changing the orientation of the alkyl tail groups in the tail groups of the ordered structure. Instead of forming a layered structure 350 exhibiting an SmA mesophase as shown in FIG. 3B, the addition of CH$_3$ groups to the alkyl chain forms a nanopore/rod structure 450 as shown in FIGS. 5A-5F.

Figure 6:
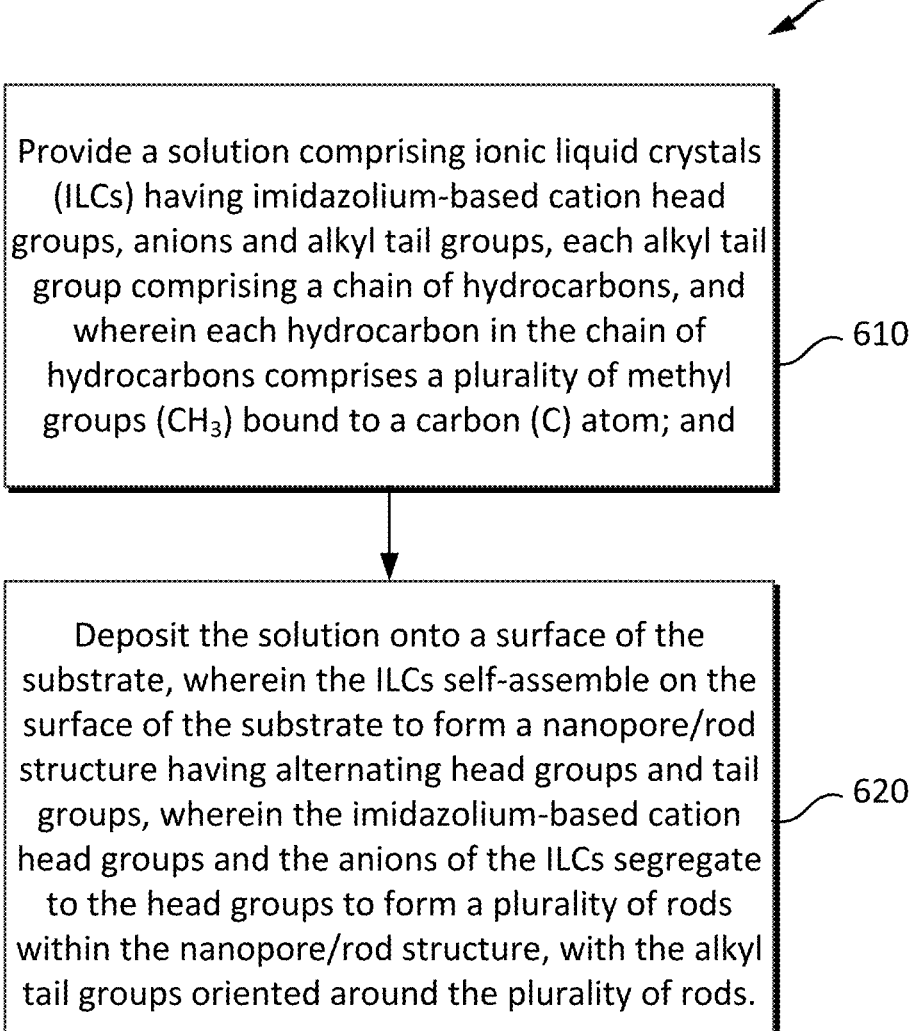
FIG. 6 is a flowchart diagram illustrating a method that may be used to form a self-assembled ILC structure formed on a substrate in accordance with one embodiment of the present disclosure.

FIG. 6 illustrates an embodiment of a method 600 that uses the techniques described herein to form a self-assembled ILC structure formed on a substrate. It will be recognized that the embodiment of the method 600 shown in FIG. 6 is merely exemplary and additional methods may utilize the techniques described herein. Further, additional processing steps may be added to the method 600 shown in FIG. 6 as the steps described are not intended to be exclusive. Moreover, the order of the steps is not limited to the order shown in the figure as different orders may occur and/or various steps may be performed in combination or at the same time.

The method 600 shown in FIG. 6 includes providing a solution comprising ionic liquid crystals (ILCs) having imidazolium-based cation head groups, anions and alkyl tail groups, each alkyl tail group comprising a chain of hydrocarbons (in step 610) and depositing the solution onto a surface of a substrate (in step 620). In the method 600, each hydrocarbon in the chain of hydrocarbons comprises a plurality of methyl groups (CH$_3$) bound to a carbon (C) atom. Once deposited in step 620, the ILCs self-assemble on the surface of the substrate to form a nanopore/rod structure having alternating head groups and tail groups. An example of a nanopore/rod structure 450 is shown in FIGS. 5A-5F. As shown in FIGS. 5A-5F, the imidazolium-based cation head groups and the anions of the ILCs segregate to the head groups to form a plurality of rods 456 within the nanopore/rod structure 450, with the alkyl tail groups oriented around the plurality of rods.

Similar to the previous method, the ILCs used in the method 600 may include a wide variety of imidazolium-based cation head groups, anions and alkyl chain lengths. In some embodiments, the imidazolium-based cation head groups may be of the form: 1-R$_1$-3-R$_2$-imidazolium, where R$_1$ is an alkyl chain with a chain length ranging from 8-18 hydrocarbons, and R$_2$ is a hydrogen, methyl, ethyl, propyl, butyl, substituted or unsubstituted phenyl, or other hydrocarbon group. In one example embodiment, the imidazolium-based cation head groups may be 1-dodecyl-3-methylimidazolium (C$_{12}$mim); however, imidazolium-based ILCs having anywhere from 8 hydrocarbons (C8mim) to 18 hydrocarbons (C18mim) in the alkyl chain can also be used. As noted above, the anions included within the ILCs may be organic or metalate anions having a variety of valences. Although certainly not limited to such, the ILCs used in the method 600 may tetrafluoroborate (BF$_4^-$) anions in one embodiment.

The method 600 shown in FIG. 6 forms a nanopore/rod structure having a plurality of rods, which are evenly distributed within the nanopore/rod structure with equal spacing between each of the plurality of rods. When [C$_{12}$mim][CH$_3$][BF$_4^-$] ILCs are used in the method 600 to form a nanopore/rod structure 450, as shown in FIG. 5F, the plurality of rods 456 are evenly distributed within the nanopore/rod structure 450 with a spacing of about 3 nm and a diameter of about 1.1 nm. Other ILCs having potentially different imidazolium-based cation head groups, anions and alkyl chain lengths may also be used in the method 600 to form nanopore/rod structure having different inter-rod spacings or diameters.

Various embodiments of methods are provided herein for forming self-assembled ILCs structures and for controlling the phase of self-assembled ILCs structures. In the disclosed embodiments, the phase of an ordered structure is controlled by replacing hydrogen (H) atoms within the chain of hydrocarbons with larger functional groups (e.g., methyl (CH$_3$) groups) prior to depositing the solution onto the surface of the substrate. As noted above and shown in the drawings, replacing the H atoms with larger CH$_3$ groups adds bulk to the alkyl chain and prevents the alkyl tail groups from interdigitating within the tail groups of the ordered structure. In addition to increasing the separation between the alkyl tail groups, adding CHs groups to the alkyl chain changes the orientation of the alkyl tail groups within the tail groups of the ordered structure, which changes the phase of the ordered structure.

The techniques described herein provide new methods for controlling the phase of ordered structures formed on a substrate surface via self-assembly of ILCs. In some embodiments, additional techniques can be combined with those described herein to: (a) tune the pitch of the ordered structures formed on the substrate surface, (b) tune the orientation of the ordered structures formed on a wide variety of substrate surfaces and/or (c) overcome the challenges faced when transferring the patterning information of the ordered structures to an underlying substrate.

Co-pending U.S. patent application Ser. No. 18/677,972, entitled "Methods for Controlling the Pitch of Self-Assembled Ionic Liquid Crystal (ILC) Structures," provides various methods for controlling the pitch of the self-assembled ILC structures. As noted in the co-pending application, the pitch (p) of an ordered structure (e.g., a layered structure) can be controlled by controlling a cation/anion charge ratio of the ILCs used to form the ordered structure. Depending on the valency of the cation head groups and anions included within the ILCs, the ILCs may self-assemble with interdigitated alkyl tail groups, alkyl tail groups aligned tail-to-tail, or alkyl tail groups that are spaced even further apart. In some embodiments, an ionic liquid (IL) may be added to the ILCs to further increase the pitch (p) of the ordered structures by increasing the width of the head group layers. In addition, minor pitch adjustments can be made by changing the alkyl chain length of the ILCs and/or the IL.

Co-pending U.S. patent application Ser. No. 18/388,240, entitled "Methods for Forming Vertically Layered Ionic Liquid Crystal (ILC) Structures on a Semiconductor Substrate," provides various methods for controlling the orientation of the self-assembled ILC structures. As noted in the co-pending application, a vertically oriented structure (e.g., a vertically layered structure) may be formed on a variety of substrate surfaces by exposing the ILC solution to a gas phase, non-polar solvent (such as, e.g., hexane gas) as the ILC solution is being deposited onto the substrate surface. Because the gas phase, non-polar solvent provides an ambient environment, which neither attracts nor repels the polar molecules of the ILCs, the gas phase, non-polar solvent enables the ILCs to orient themselves into a vertically layered structure on a periodic substrate surface and/or within features (e.g., trenches, holes, etc.) having a neutral bottom surface and hydrophilic sidewalls.

In some embodiments, a vertically oriented structure may be used to pattern a substrate surface. However, forming a vertically oriented structure on a substrate surface is only one challenge that must be overcome to enable self-assembled ILCs to be used for pattern transfer. After a vertically oriented pattern of self-assembled ILCs is formed on a substrate surface, additional challenges must be overcome to successfully transfer the vertically oriented pattern to an underlying surface. For example, removing the alkyl tail groups from the ILC film leaves an ionic liquid on the substrate surface. On the other hand, removing the cation head groups from the ILC film leaves the alkyl tail groups, which are also liquid at room temperature. The remaining group (e.g., the anions) within the ILC film is mobile in both of these options, so no patterning information will be maintained if one or more groups of the self-assembled ILC is removed.

Co-pending U.S. patent application Ser. No. 18/388,222, entitled "Methods for Patterning a Semiconductor Substrate Using Metalate Salt Ionic Liquid Crystals," overcomes the challenges faced when transferring the patterning information of self-assembled ILCs to an underlying substrate. The co-pending application discloses various methods to pattern a semiconductor substrate using direct self-assembly of metalate salt ILCs followed by oxidation of the self-assembled metalate salt ILC film to produce a robust metal oxide pattern, which can be transferred to an underlying layer of a semiconductor substrate.

As noted in the co-pending application, metalate salt ILCs can be synthesized by dissolving stoichiometric amounts of metal halides in imidazolium-based ILCs with a halide anion. A wide variety of metal halides and halide anions can be combined with imidazolium-based ILCs to synthesize metalate salt ILCs. For example, aluminum chloride ($AlCl_3$) can be dissolved in 1-docecyl-3-methylimidazolium chloride to form 1-dodecyl-3-methylimidazolium tetrachloroaluminate. The metalate salt ILCs formed in such synthesis contain an imidazolium-based cation head group covalently bound to an elongated alkyl tail group and metalate anion (e.g., tetrachloroaluminate ($AlCl_4^-$)). Other metalate salt ILCs can be formed by dissolving other metal halides in ionic liquid crystal (ILC) halide salts.

Similar to other ILCs, metalate salt ILCs can self-assemble into solid (crystalline phase) ordered structures at or near room temperature. The difference in polarity between the cation head groups and the metalate anions promote direct self-assembly of the metalate salt ILC molecules by segregating the head and tail groups into layered structures (or "lamellar structures") with the cation head groups and metalate anions segregated to the head group layers and the alkyl tail groups segregated to the tail group layers. Similar to other ILCs, the orientation of the self-assembled metalate salt ILCs can be controlled by controlling the deposition temperature and the hydrophobicity of the surface(s) upon which the metalate salt ILCs are deposited. In some embodiments, the layer pitch of the self-assembled metalate salt ILCs can be controlled by: (a) controlling the cation/anion charge ratio of the cation head groups and anions included within the metalate salt ILCs, and/or (b) adding an ionic liquid to the metalate salt ILCs. For 1-dodecyl-3-methylimidazolium-based metalate salt ILCs, the layer pitch may be range between approximately 3-6 nm by performing one or more of the pitch control methods (a)-(b).

After self-assembly, an oxidation process (e.g., an oxygen plasma ashing, ultra-violet (UV) ozone, gas phase oxidation or solution phase oxidation process) can be used to oxidize the metalate salt ILC film and form a more robust pattern that can be transferred to the underlying substrate. The oxidation process removes the alkyl tail group layers from the vertically layered ILC structures by converting the organic material within the alkyl tail group layers into volatile carbon oxides, which are removed from the substrate surface during the oxidation process. However, the metalate anions within the head group layers are converted into non-volatile metal oxides, which are left on the substrate surface after oxidation. In doing so, the oxidation process volatizes the ionic liquid crystal layer, but leaves behind a metal oxide pattern where the metalate anions were concentrated. The metal oxide pattern left on the substrate surface is more robust than the ILC film, and as such, can be used as a hard mask for pattern transfer to underlying layer(s).

The term "semiconductor substrate" or "substrate" as used herein means and includes a base material or construction upon which materials are formed. It will be appreciated that the substrate may include a single material, a plurality of layers of different materials, a layer or layers having regions of different materials or different structures in them, etc. These materials may include semiconductors, insulators, conductors, or combinations thereof. For example, the substrate may be a semiconductor substrate, a base semiconductor layer on a supporting structure, a metal electrode or a semiconductor substrate having one or more layers, structures or regions formed thereon. The substrate may be a conventional silicon substrate or other bulk substrate comprising a layer of semi-conductive material. As used herein, the term "bulk substrate" means and includes not only silicon wafers, but also silicon-on-insulator ("SOI") substrates, such as silicon-on-sapphire ("SOS") substrates and silicon-on-glass ("SOG") substrates, epitaxial layers of silicon on a base semiconductor foundation, and other semiconductor or optoelectronic materials, such as silicon-germanium, germanium, gallium arsenide, gallium nitride, and indium phosphide. The substrate may be doped or undoped.

The substrate may also include any material portion or structure of a device, particularly a semiconductor or other electronics device, and may, for example, be a base substrate structure, such as a semiconductor substrate or a layer on or overlying a base substrate structure. Thus, the term "substrate" is not intended to be limited to any particular base structure, underlying layer or overlying layer, patterned layer or unpatterned layer, but rather, is contemplated to include any such layer or base structure, and any combination of layers and/or base structures.

It is noted that reference throughout this specification to "one embodiment" or "an embodiment" means that a particular feature, structure, material, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention. Furthermore, the particular features, structures, materials, or characteristics may be combined in any suitable manner in one or more embodiments. Various additional layers and/or structures may be included and/or described features may be omitted in other embodiments.

One skilled in the relevant art will recognize that the various embodiments may be practiced without one or more of the specific details, or with other replacement and/or additional methods, materials, or components. In other instances, well-known structures, materials, or operations are not shown or described in detail to avoid obscuring aspects of various embodiments of the invention. Similarly, for purposes of explanation, specific numbers, materials, and configurations are set forth in order to provide a thorough understanding of the invention. Nevertheless, the invention may be practiced without specific details. Furthermore, it is understood that the various embodiments shown in the figures are illustrative representations and are not necessarily drawn to scale.

Further modifications and alternative embodiments of the methods described herein will be apparent to those skilled in the art in view of this description. It will be recognized, therefore, that the described methods are not limited by these example arrangements. It is to be understood that the forms of the methods herein shown and described are to be taken as example embodiments. Various changes may be made in the implementations. Thus, although the inventions are described herein with reference to specific embodiments, various modifications and changes can be made without departing from the scope of the present inventions. Accordingly, the specification and figures are to be regarded in an illustrative rather than a restrictive sense, and such modifications are intended to be included within the scope of the present inventions. Further, any benefits, advantages, or solutions to problems that are described herein with regard to specific embodiments are not intended to be construed as a critical, required, or essential feature or element of any or all the claims.

What is claimed is:

1. A method to control a phase of a self-assembled ionic liquid crystal (ILC) structure formed on a substrate, the method comprising:

providing a solution comprising ionic liquid crystals (ILCs) having cation head groups, anions and alkyl tail groups, each alkyl tail group comprising a chain of hydrocarbons;

depositing the solution onto a surface of the substrate, wherein the ILCs self-assemble on the surface of the substrate to form an ordered structure having alternating head groups and tail groups, wherein the cation head groups and the anions of the ILCs segregate to the head groups and the alkyl tail groups segregate to the tail groups; and controlling the phase of the ordered structure by replacing hydrogen (H) atoms within the chain of hydrocarbons with larger functional groups prior to depositing the solution onto the surface of the substrate.

2. The method of claim 1, wherein the cation head groups comprise an imidazolium, pyrazolium, pyrrolidinium, pyridinium, piperidinium, morpholinium, ammonium, phosphonium, sulphonium or cholinium-based cation head group.

3. The method of claim 1, wherein the cation head groups comprise an imidazolium-based cation head group of the form: $1\text{-}R_1\text{-}3\text{-}R_2$-imidazolium, where $R_1$ is an alkyl chain with a chain length ranging from 8-18 hydrocarbons, and $R_2$ is a hydrogen, methyl, ethyl, propyl, butyl, substituted or unsubstituted phenyl, or other hydrocarbon group.

4. The method of claim 3, wherein the cation head groups comprise 1-dodecyl-3-methylimidazolium.

5. The method of claim 3, wherein the anions comprise tetrafluoroborate $(BF_4^-)$, chloride $(Cl^-)$, acetate $(CH_3COO^-)$, hexafluorophosphate $(PF_6^-)$, trifluoromethyl acetate $(C_3H_3F_3O_2^-)$, nitrate $(NO_3^-)$, dicyanamide $(C_2HN_3^-)$, tetracyanoborate $(B(CN)_4^-)$, trifluoromethane sulfonate $(CF_3O_3S^-)$, bis((trifluoromethyl)sulfonyl)imdide $([(CF_3SO_2)_2N]^-)$, tetrachloroaluminate $([AlCl_4]^-)$, heptachlorodialuminate $([Al_2Cl_7]^-)$, decachlorotrialuminate $([Al_3Cl_{10}]^-)$, tridecachlorotetraaluminate $([Al_4Cl_{13}]^-)$, tetrachloroferrate $(Cl_4Fe^-)$, trichlorostannate $([SnCl_3]^-)$, pentachlorodistannate $([Sn_2Cl_5]^-)$, tetrachloroindate $([InCl_4]^-)$, nonachloroditltanate $([Ti_2Cl_9]^-)$, nonachlorodizirconate $([Zr_2Cl_9]-)$, nonachlorodihafnate $([Hf_2Cl_9]-)$, tetrachloroaurate $([AuCl_4]-)$, tetrachlorogallate $([GaCl_4]-)$, heptachlorodigallate $([Ga_2Cl_7]-)$, decachlorotrigallate $([Ga_3Cl_{10}]-)$, trichloroplumbate $([PbCl_3]-)$, pentachlorodoindate $([InCl_5]^{2-})$, tetrachlorozincate $([ZnCl_4]^{2-})$, hexachlorodizincate $([Zn_2Cl_6]^{2-})$, hexachlorotitanate $([TiCl_6]^{2-})$, hexachlorozirconate $([ZrCl_6]^{2-})$, decachlorodizirconate $([Zr_2Cl_{10}]^{2-})$, hexachlorohafnate $([HfCl_6]^{2-})$, decachlorodihafnate $([Hf_2Cl_{10}]^{2-})$, tetrachloromanganate $([MnCl_4]^{2-})$, tetrachloroferrate $([FeCl_4]^{2-})$, tetrachlorocobaltate $([CoCl_4]^{2-})$, tetrachloronicklate $([NiCl_4]^{2-})$, tetrachloropaladate $([PdCl_4]^{2-})$, tetrachloroplatinate $([PtCl_4]^{2-})$, tetrachlorocuprate $([CuCl_4]^{2-})$, octachlorotrizincate $([Zn_3Cl_8]^{2-})$, decachlorotetrazincate $([Zn_4Cl_{10}]^{2-})$, tetrachlorocadmate $([CdCl_4]^{2-})$, hexachlorodicadmate $([Cd_2Cl_6]^{2-})$, tetrachloromercurate $([HgCl_4]^{2-})$, or tetrachloroplumbate $([PbCl_4]^{2-})$.

6. The method of claim 3, wherein said controlling the phase of the ordered structure comprises replacing the hydrogen (H) atoms with methyl $(CH_3)$ groups prior to depositing the solution onto the surface of the substrate.

7. The method of claim 6, wherein said replacing the hydrogen (H) atoms with the methyl $(CH_3)$ groups changes the phase of the ordered structure by: (a) increasing a separation between the alkyl tail groups in the tail groups of the ordered structure, and (b) changing an orientation of the alkyl tail groups in the tail groups of the ordered structure.

8. The method of claim 7, wherein the ILCs self-assemble on the surface of the substrate to form a nanopore/rod structure having alternating head groups and tail groups, wherein the cation head groups and the anions segregate to the head groups to form a plurality of rods within the nanopore/rod structure, with the alkyl tail groups oriented around the plurality of rods.

9. The method of claim 8, wherein the plurality of rods are evenly distributed within the nanopore/rod structure with equal spacing between each of the plurality of rods.

10. A method to form a self-assembled ionic liquid crystal (ILC) structure on a substrate, the method comprising:

providing a solution comprising ionic liquid crystals (ILCs) having imidazolium-based cation head groups, anions and alkyl tail groups, each alkyl tail group comprising a chain of hydrocarbons, and wherein each hydrocarbon in the chain of hydrocarbons comprises a plurality of methyl groups $(CH_3)$ bound to a carbon (C) atom; and depositing the solution onto a surface of the substrate, wherein the ILCs self-assemble on the surface of the substrate to form a nanopore/rod structure having alternating head groups and tail groups, wherein the imidazolium-based cation head groups and the anions of the ILCs segregate to the head groups to form a plurality of rods within the nanopore/rod structure, with the alkyl tail groups oriented around the plurality of rods.

11. The method of claim 10, wherein the imidazolium-based cation head groups are of the form: $1\text{-}R_1\text{-}3\text{-}R_2$-imidazolium, where $R_1$ is an alkyl chain with a chain length ranging from 8-18 hydrocarbons, and $R_2$ is a hydrogen, methyl, ethyl, propyl, butyl, substituted or unsubstituted phenyl, or other hydrocarbon group.

12. The method of claim 10, wherein the imidazolium-based cation head groups comprise 1-dodecyl-3-methylimidazolium.

13. The method of claim 10, wherein the anions comprise tetrafluoroborate $(BF_4^-)$, chloride $(Cl^-)$, acetate $(CH_3COO^-)$, hexafluorophosphate $(PF_6^-)$, trifluoromethyl acetate $(C_3H_3F_3O_2^-)$, nitrate $(NO_3^-)$, dicyanamide $(C_2HN_3^-)$, tetracyanoborate $(B(CN)_4^-)$, trifluoromethane sulfonate $(CF_3O_3S^-)$, bis((trifluoromethyl)sulfonyl)imdide $([(CF_3SO_2)_2N]^-)$, tetrachloroaluminate $([AlCl_4]^-)$, heptachlorodialuminate $([Al_2Cl_7]^-)$, decachlorotrialuminate $([Al_3Cl_{10}]^-)$, tridecachlorotetraaluminate $([Al_4Cl_{13}]^-)$, tetrachloroferrate $(Cl_4Fe^-)$, trichlorostannate $([SnCl_3]^-)$, pentachlorodistannate $([Sn_2Cl_5]^-)$, tetrachloroindate $([InCl_4]—)$, nonachlorodititanate $([Ti_2Cl_9]—)$, nonachlorodizirconate $([Zr_2Cl_9]—)$, nonachlorodihafnate $([Hf_2Cl_9]—)$, tetrachloroaurate $([AuCl_4]—)$, tetrachlorogallate $([GaCl_4]—)$, heptachlorodigallate $([Ga_2Cl_7]—)$, decachlorotrigallate $([Ga_3Cl_{10}]—)$, trichloroplumbate $([PbCl_3]—)$, pentachloridoindate $([InCl_5]^{2-})$, tetrachlorozincate $([ZnCl_4]^{2-})$, hexachlorodizincate $([Zn_2Cl_6]^{2-})$, hexachlorotitanate $([TiCl_6]^{2-})$, hexachlorozirconate $([ZrCl_6]^{2-})$, decachlorodizirconate $([Zr_2Cl_{10}]^{2-})$, hexachlorohafnate $([HfCl_6]^{2-})$, decachlorodihafnate $([Hf_2Cl_{10}]^{2-})$, tetrachloromanganate $([MnCl_4]^{2-})$, tetrachloroferrate $([FeCl_4]^{2-})$, tetrachlorocobaltate $([CoCl_4]^{2-})$, tetrachloronicklate $([NiCl_4]^{2-})$, tetrachloropaladate $([PdCl_4]^{2-})$, tetrachloroplatinate $([PtCl_4]^{2-})$, tetrachlorocuprate $([CuCl_4]^{2-})$, octachlorotrizincate $([Zn_3Cl_8]^{2-})$, decachlorotetrazincate $([Zn_4Cl_{10}]^{2-})$, tetrachlorocadmate $([CdCl_4]^{2-})$, hexachlorodicadmate $([Cd_2Cl_6]^{2-})$, tetrachloromercurate $([HgCl_4]^{2-})$, or tetrachloroplumbate $([PbCl_4]^{2-})$.

14. The method of claim 10, wherein the ILCs comprise 1-dodecyl-3-methylimidazolium tetrafluoroborate.

15. The method of claim 14, wherein the plurality of rods are evenly distributed within the nanopore/rod structure with equal spacing between each of the plurality of rods.

16. The method of claim 15, wherein the equal spacing between each of the plurality of rods is approximately 3 nm.

17. The method of claim 15, wherein a diameter of each rod is approximately 1 nm.

18. A self-assembled ionic liquid crystal (ILC) structure formed on a substrate via self-assembly of ionic liquid crystals (ILCs), wherein:

the ILCs have imidazolium-based cation head groups, anions and alkyl tail groups, wherein the alkyl tail groups each comprise a chain of hydrocarbons, and wherein each hydrocarbon in the chain of hydrocarbons comprises a plurality of methyl groups ($CH_3$) bound to a carbon (C) atom; and the ILCs self-assemble on a surface of the substrate to form a nanopore/rod structure having alternating head groups and tail groups, wherein the imidazolium-based cation head groups and the anions of the ILCs segregate to the head groups to form a plurality of rods within the nanopore/rod structure, with the alkyl tail groups oriented around the plurality of rods.

19. The self-assembled ILC structure of claim 18, wherein the imidazolium-based cation head groups are of the form: 1-$R_1$-3-$R_2$-imidazolium, where $R_1$ is an alkyl chain with a chain length ranging from 8-18 hydrocarbons, and $R_2$ is a hydrogen, methyl, ethyl, propyl, butyl, substituted or unsubstituted phenyl, or other hydrocarbon group.

20. The self-assembled ILC structure of claim 18, wherein the anions comprise tetrafluoroborate $(BF_4^-)$, chloride $(Cl^-)$, acetate $(CH_3COO^-)$, hexafluorophosphate $(PF_6^-)$, trifluoromethyl acetate $(C_3H_3F_3O_2^-)$, nitrate $(NO_3^-)$, dicyanamide $(C_2HN_3^-)$, tetracyanoborate $(B(CN)_4^-)$, trifluoromethane sulfonate $(CF_3O_3S^-)$, bis((trifluoromethyl)sulfonyl)imdide $([(CF_3SO_2)_2N]^-)$, tetrachloroaluminate $([AlCl_4]^-)$, heptachlorodialuminate $([Al_2Cl_7]^-)$, decachlorotrialuminate $([Al_3Cl_{10}]^-)$, tridecachlorotetraaluminate $([Al_4Cl_{13}]^-)$, tetrachloroferrate $(Cl_4Fe^-)$, trichlorostannate $([SnCl_3]^-)$, pentachlorodistannate $([Sn_2Cl_5]^-)$, tetrachloroindate $([InCl_4]^-)$, nonachlorodititanate $([Ti_2Cl_9]^-)$, nonachlorodizirconate $([Zr_2Cl_9]^-)$, nonachlorodihafnate $([Hf_2Cl_9]^-)$, tetrachloroaurate $([AuCl_4]^-)$, tetrachlorogallate $([GaCl_4]^-)$, heptachlorodigallate $([Ga_2Cl_7]^-)$, decachlorotrigallate $([Ga_3Cl_{10}]^-)$, trichloroplumbate $([PbCl_3]^-)$, pentachloridoindate $([InCl_5]^{2-})$, tetrachlorozincate $([ZnCl_4]^{2-})$, hexachlorodizincate $([Zn_2Cl_6]^{2-})$, hexachlorotitanate $([TiCl_6]^{2-})$, hexachlorozirconate $([ZrCl_6]^{2-})$, decachlorodizirconate $([Zr_2Cl_{10}]^{2-})$, hexachlorohafnate $([HfCl_6]^{2-})$ decachlorodihafnate $([Hf_2Cl_{10}]^{2-})$, tetrachloromanganate $([MnCl_4]^{2-})$, tetrachloroferrate $([FeCl_4]^{2-})$ tetrachlorocobaltate $([CoCl_4]^{2-})$, tetrachloronicklate $([NiCl_4]^{2-})$ tetrachloropaladate $([PdCl_4]^{2-})$, tetrachloroplatinate $([PtCl_4]^{2-})$, tetrachlorocuprate $([CuCl_4]^{2-})$, octachlorotrizincate $([Zn_3Cl_8]^{2-})$, decachlorotetrazincate $([Zn_4Cl_{10}]^{2-})$, tetrachlorocadmate $([CdCl_4]^{2-})$, hexachlorodicadmate $([Cd_2Cl_6]^{2-})$, tetrachloromercurate $([HgCl_4]^{2-})$, or tetrachloroplumbate $([PbCl_4]^{2-})$.

21. The self-assembled ILC structure of claim 18, wherein the ILCs comprise 1-dodecyl-3-methylimidazolium tetrafluoroborate.

22. The self-assembled ILC structure of claim 21, wherein the plurality of rods are evenly distributed within the nanopore/rod structure with equal spacing between each of the plurality of rods.

23. The self-assembled ILC structure of claim 22, wherein the equal spacing between each of the plurality of rods is approximately 3 nm.

24. The self-assembled ILC structure of claim 22, wherein a diameter of each rod is approximately 1 nm.

\* \* \* \* \*